June 24, 1952 V. G. KLEIN ET AL 2,601,301

RECORD CHANGER

Filed Nov. 21, 1945 16 Sheets-Sheet 1

Victor G. Klein,
Carl H. Mueller,
Inventors.
Haynes and Koenig,
Attorneys.

Victor G. Klein,
Carl H. Mueller,
Inventor.
Haynes and Koenig,
Attorneys.

Victor G. Klein,
Carl H. Mueller,
Inventor.
Haynes and Koenig,
Attorneys.

Victor G. Klein,
Carl H. Mueller,
Inventors.
Haynes and Koenig,
attorneys.

Victor G. Klein,
Carl H. Mueller,
Inventors.
Haynes and Koenig
Attorneys.

June 24, 1952 V. G. KLEIN ET AL 2,601,301

RECORD CHANGER

Filed Nov. 21, 1945 16 Sheets-Sheet 6

Victor G. Klein,
Carl H. Mueller,
Inventors.
Haynes and Koenig,
Attorneys.

Victor G. Klein,
Carl H. Mueller,
Inventors.
Haynes and Koenig,
Attorneys.

Victor G. Klein,
Carl H. Mueller,
Inventors.
Haynes and Koenig,
Attorneys.

Victor G. Klein,
Carl H. Mueller,
Inventors.
Haynes and Koenig,
Attorneys.

Victor G. Klein
Carl H. Mueller,
Inventors.
Haynes and Koenig,
Attorneys.

Victor G. Klein,
Carl H. Mueller,
Inventors
Haynes and Koenig
Attorneys.

June 24, 1952 V. G. KLEIN ET AL 2,601,301

RECORD CHANGER

Filed Nov. 21, 1945 16 Sheets-Sheet 12

Victor G. Klein,
Carl H. Mueller,
Inventors.
Haynes and Koenig,
Attorneys.

Victor G. Klein,
Carl H. Mueller,
Inventors.
Haynes and Koenig,
Attorneys.

Victor G. Klein,
Carl H. Mueller,
Inventors.
Haynes and Koenig,
Attorneys.

June 24, 1952 V. G. KLEIN ET AL 2,601,301

RECORD CHANGER

Filed Nov. 21, 1945 16 Sheets-Sheet 15

Victor G. Klein,
Carl H. Mueller,
Inventors.
Haynes and Koenig,
Attorneys.

Victor G. Klein,
Carl H. Mueller,
Inventors.
Haynes and Koenig
Attorneys.

Patented June 24, 1952

2,601,301

UNITED STATES PATENT OFFICE 2,601,301

RECORD CHANGER

Victor G. Klein, St. Louis, and Carl H. Mueller, Ferguson, Mo., assignors to Lincoln Engineering Company, St. Louis, Mo., a corporation of Missouri Application November 21, 1945, Serial No. 629,932

57 Claims. (Cl. 274—10)

This invention relates to record changers, and with regard to certain more specific features, to a phonograph disc record changer.

Among the several objects of the invention may be noted the provision of a quiet, relatively compact and inexpensive machine for sequentially changing records in connection with a phonograph; the provision of a record changer of the class described which without special adjustments will sequentially play records of widely different sizes; the provision of a record changer of the class described which will play in sequence both sides of each record in series according to the so-called "manual" recording wherein a musical sequence is recorded serially alternately on the fronts and backs of successive records, and which will also play so-called "drop" recordings, wherein a musical sequence is on given faces of successive records and then in sequence on their reverse faces; the provision of a record changer of the class described which can be set to repeat the playing of any desired record face and then if desired continue a sequence; the provision of a changer of the class described which handles records speedily but gently and without danger of breakage; the provision of a changer of the class described which is substantially foolproof in operation, requiring only the simplest operating procedure; the provision of a changer of the class described in which factory adjustments for perfect operation may readily be made and held; and the provision of a device of the class described which is economical to manufacture in quantity and which is easy to service and maintain. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated:

Similar reference characters indicate corresponding parts throughout the several views of the drawings.

The record changers heretofore in use have been mechanically complex, costly and hard on records, particularly in those forms of the changers wherein attempt was made to accommodate records of both the so-called "manual" recording and "drop" recording types. In addition, the former machines required a special operating technique on the part of the user which often led to confusion and even record breakage. The present invention overcomes the above difficulties and may be carried out by a much simpler and less costly machine and one which may be built with more dimensional tolerances.

Figure 1:
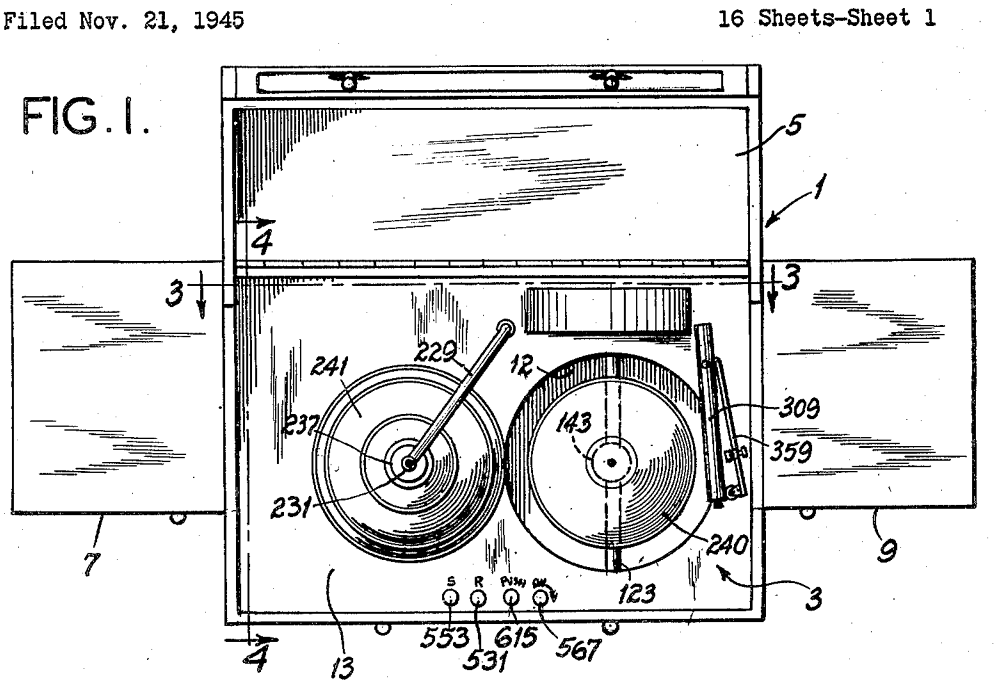
Fig. 1 is a top plan view of the apparatus shown open.
Figure 2:
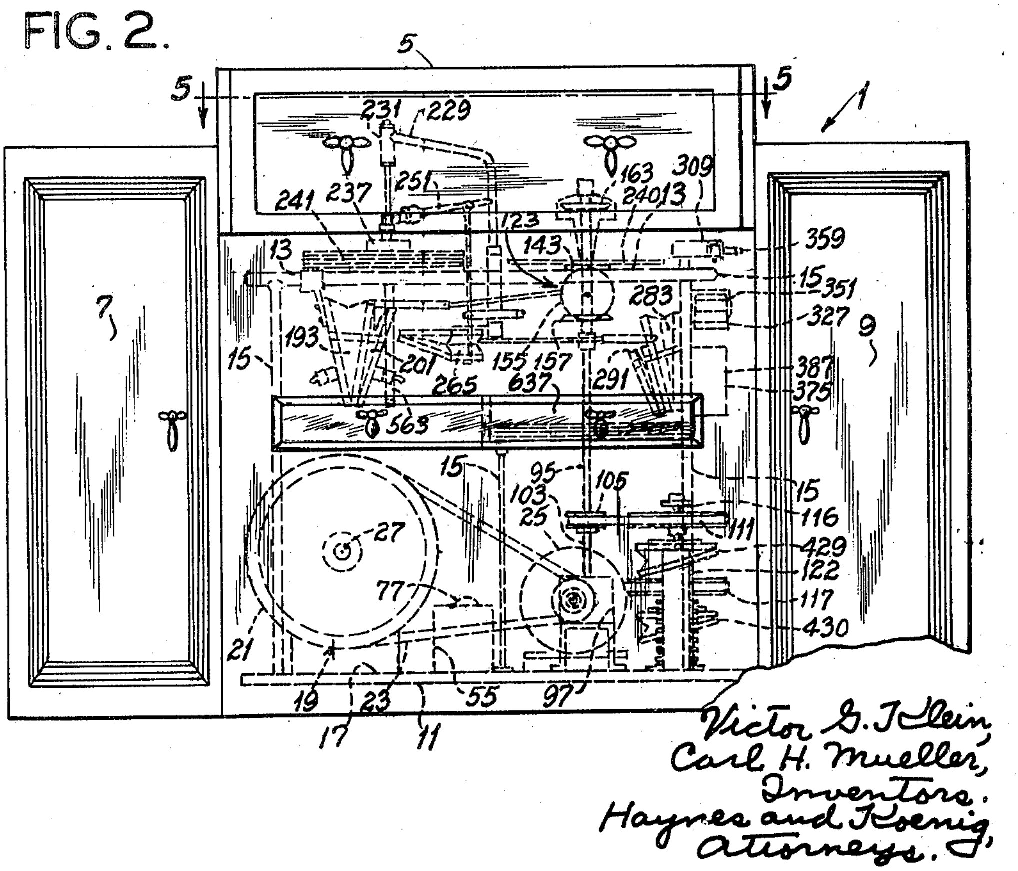
Fig. 2 is a front elevation shown closed.

Referring now more particularly to Figs. 1 and 2, there is shown at numeral 1 a console type of case having a central section 3 above which is hinged an openable lid 5. The lid is shown open in Fig. 1 and closed in Fig. 2. At the left is a record storage compartment 7 and at the right a compartment 9 for the usual electrical sound producing and amplifying system, the details of which form no part of the present invention. The section 3 has a bottom support 11 for supporting the record changer parts. At the top is a table 13 for supporting a stack of records. A hole 12 at the right in the table 13 (Figs. 1 and 5) is located above a record receiving drawer 637.

Figures 3, 48:
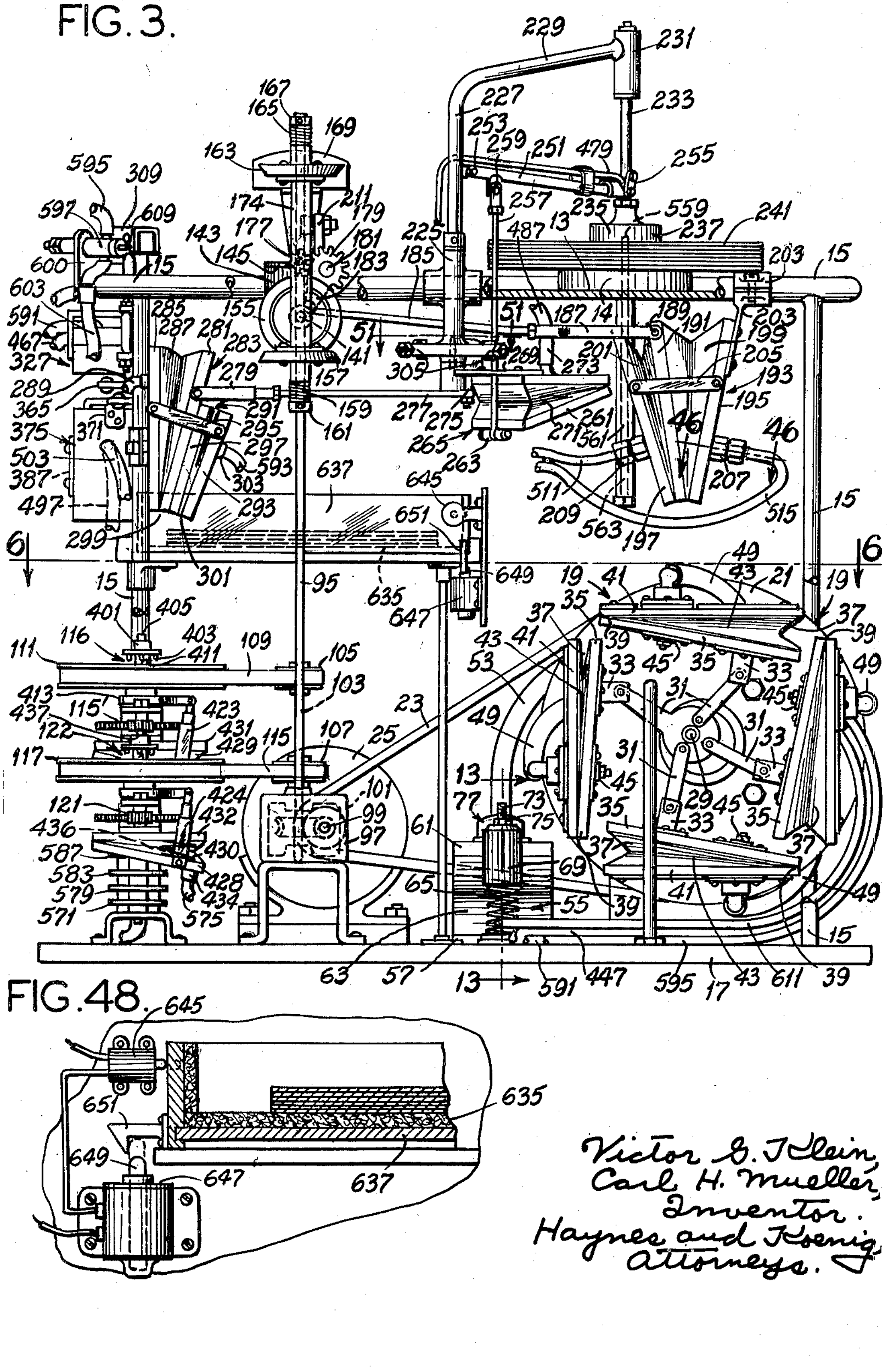
Fig. 3 is a rear elevation of mechanical structure removed from a case, being taken on line 3—3 of Fig. 1, certain parts being broken away for clarity.
Fig. 48 is a detail section of a record receiver drawer interlock control.
Figures 4, 47:
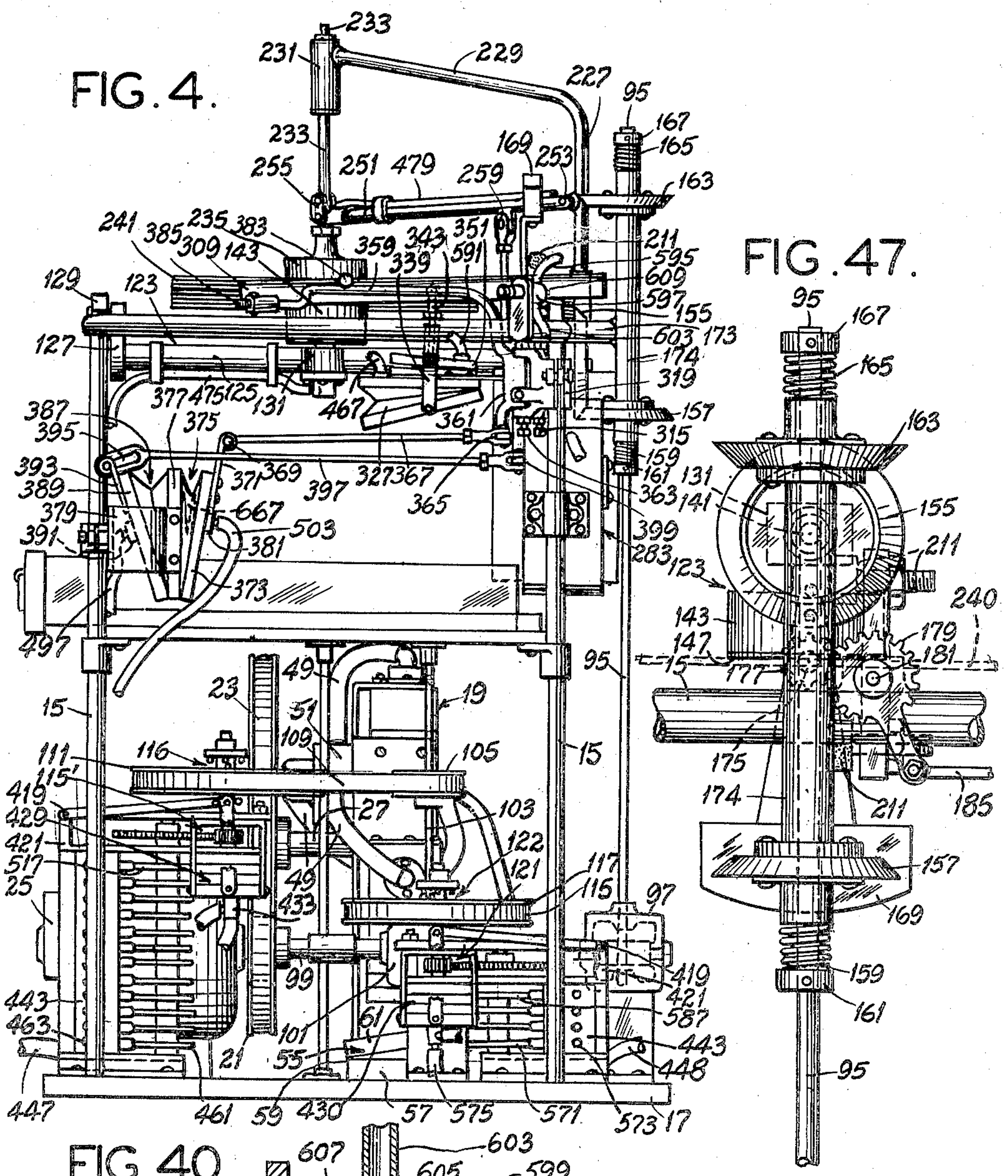
Fig. 4 is a left-hand elevation of Fig. 3 being taken on line 4—4 of Fig. 1, certain parts being broken away.
Fig. 47 is an enlarged vertical section taken on line 47—47 of Fig. 5.
Figure 5:
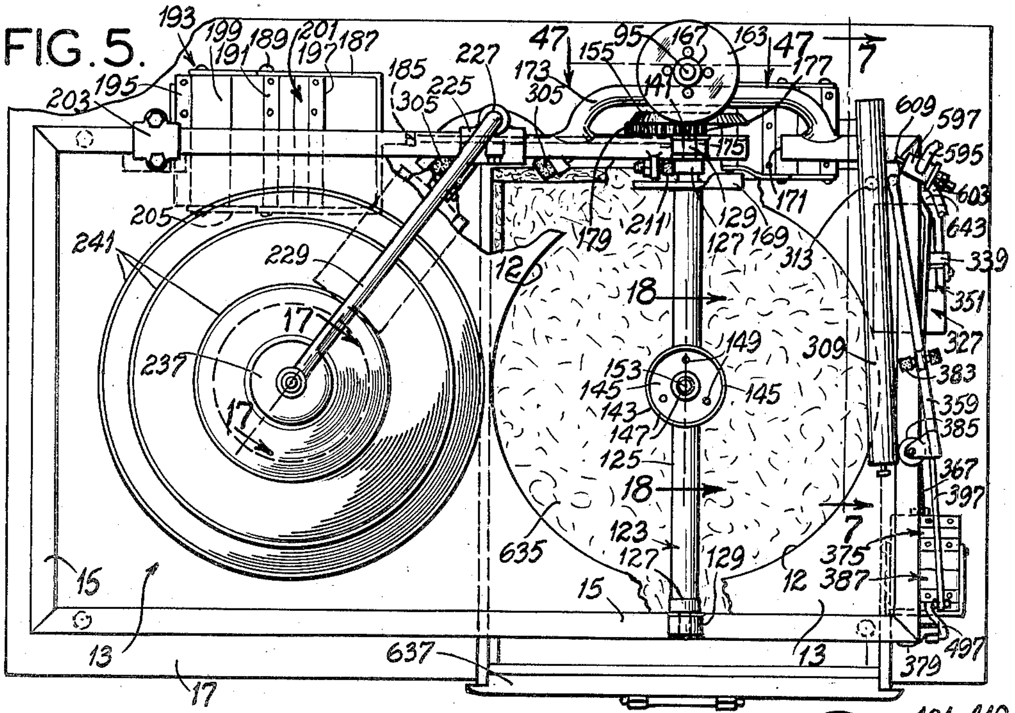
Fig. 5 is a horizontal section taken on line 5—5 of Fig. 2.
Figures 21, 22, 44, 45:
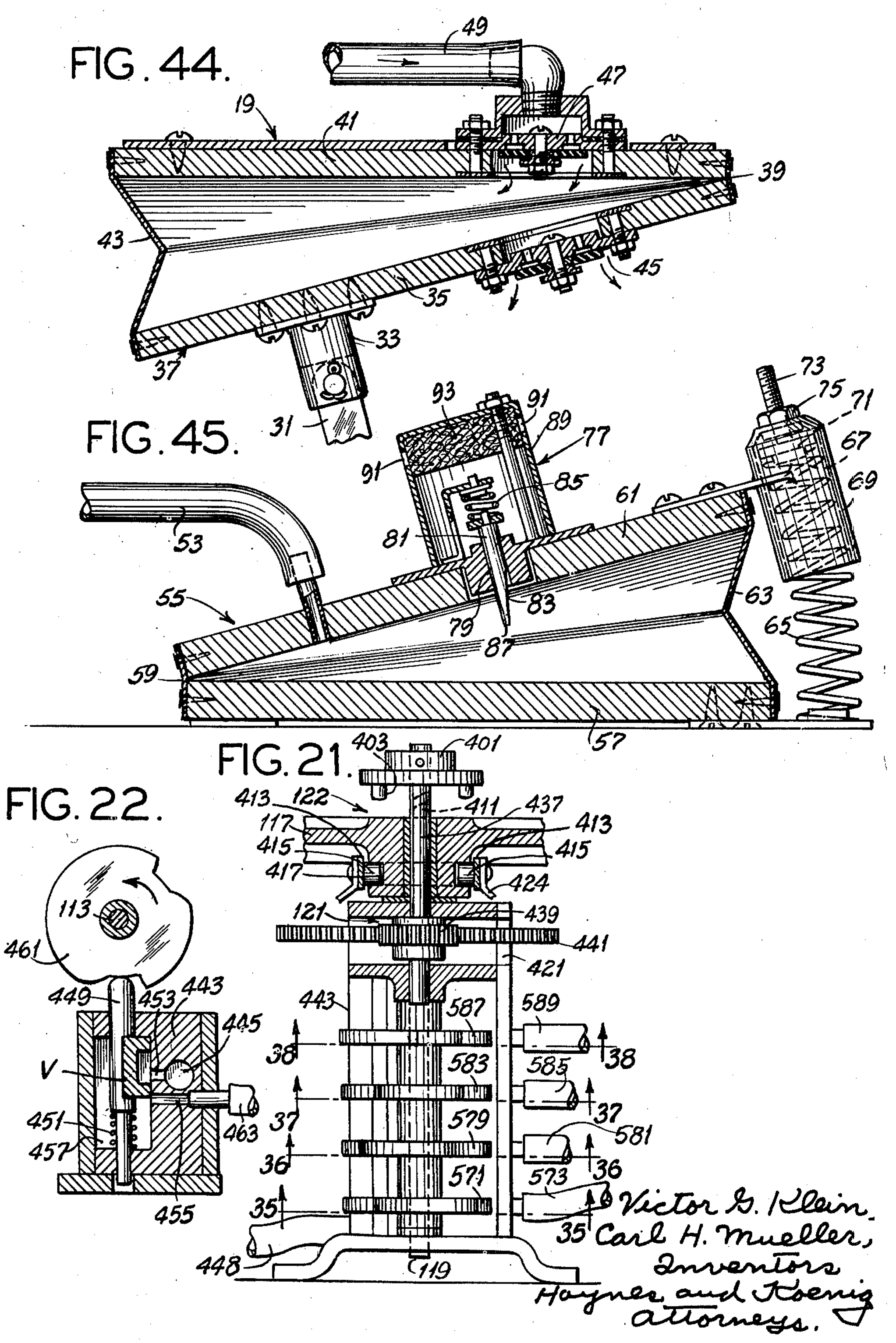
Fig. 21 is a vertical section taken on line 21—21 of Fig. 6, showing a second cam mechanism for controlling repeating operations.
Fig. 22 is a detail section taken on line 22—22 of Fig. 19, showing a typical cam-operated control valve.
Fig. 44 is an enlarged detail sectional view taken on line 44—44 of Fig. 6, showing a pump bellows.
Fig. 45 is an enlarged longitudinal detail section taken on line 45—45 of Fig. 6, showing a regulator bellows.

Referring to Figs. 3, 4 and 5, the assembly of parts within the compartment 3 is shown. This assembly consists of a frame 15 on a bed 17. On the bed 17 is a vacuum pump indicated in general at 19. This pump has a driving pulley 21 driven by a belt 23 from a motor 25. The main pump shaft 27 (driven from said pulley 21) drives an eccentrically located crank pin 29 from which extend four connecting rods 31 to four clevises 33 respectively. The clevises 33 are respectively attached to rockers 35 of a set of four vacuum bellows 37. A detail of each bellows is shown in Fig. 44. The rocker 35 of each bellows is pivoted at 39 to a stationary block 41, the usual air-tight folded bellows material 43 being attached between the rocker 35 and the block 41. An exhaust valve 45 allows outward but not inward flow of air, as indicated by the arrows. In the block 41 is a suction valve 47 allowing inward but not outward flow of air. Thus oscillation of the rocker 35 upon pivot 39 tends to evacuate the space between it and the block 41 and any spaces connected with the bellows through the valve 47.

Four bellows are shown for the pump, but it will be understood that any suitable number designed to give the desired vacuum may be used. Also, other types of vacuum pumps may be employed.

Figure 6:
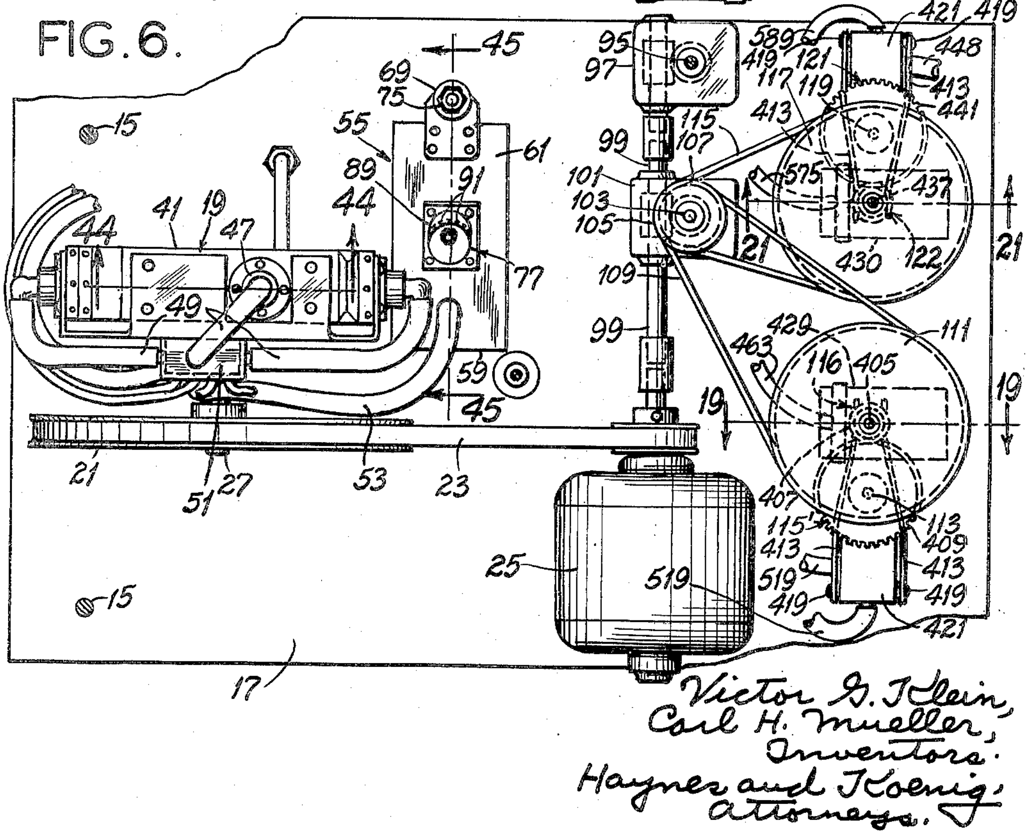
Fig. 6 is a horizontal section taken on line 6—6 of Fig. 3 but rotated 180° in the plane of paper, parts being broken away.
Figure 49:
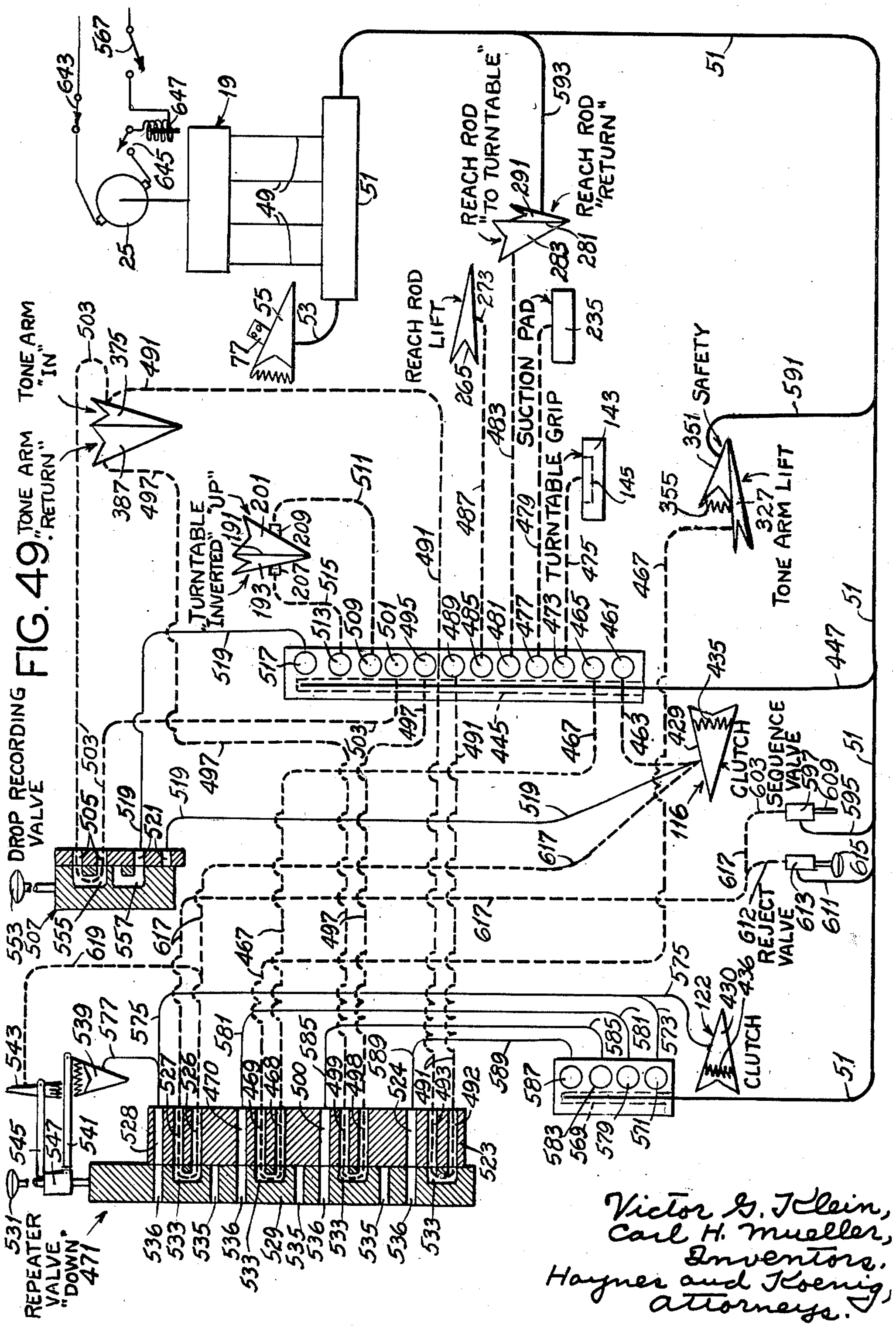
Fig. 49 is a schematic layout of the invention for "manual" recording operation, the light full lines showing inoperative pipes for the specified operation, the solid full lines showing pipes which are permanently evacuated during this operation, and the dotted lines showing controllably evacuated lines.

Each suction valve 47 is connected through a tube 49 with a suction manifold 51 (see Figs. 4, 6 and 49). As will be shown, various tubes extend from the manifold 51 for applying vacuum to various points. The manifold 51 is connected through a tube 53 with a suction regulator device 55 shown in Figs. 3, 6, 45 and 49. In detail this suction regulator device (Fig. 45) consists of a fixed block 57 to which is pivoted at 59 a rocker 61. Rocker 61 and bed 57 are also connected by means of air-tight and folded bellows material 63. Rocker 61 is biased from the block 57 by means of an expansion spring 65. The movable end 67 of the spring 65 is carried in a cup 69 having an adjustable bottom 71 controlled from a threaded stem 73 which can be locked in any adjusted position by a nut 75. Vacuum applied between the block 57 and rocker 61 tends to draw the latter to the former. In order to break the vacuum at a given pressure value, the rocker 61 carries a relief valve shown generally at 77. This valve has an inlet port 79 traversed by a valve stem 81 tapered at 83. This stem is backed by a compression spring 85. When the rocker 61 reaches a predetermined point in its travel toward block 57, the end 87 of the stem 81 touches the block. This forces the taper 83 through the port 79 to gradually break the vacuum. This stops further advance of the rocker 61 and tends to set a predetermined vacuum value. The valve assembly 77 includes a case 89 in which are inlet ports 91 covered internally by means of a sound muffler and air filter block 93 composed of felt or the like. By means of the above described parts, a predetermined value of vacuum may be maintained in the manifold 51 and the lines connected therewith.

The motor 25 in addition to driving the pump 19 also drives a vertical shaft 95 through a worm gear speed reduction box 97 (see Figs. 4, 6 and 47). The motor 25 is connected with the box 97 through a drive 99. This drive 99 also passes through a worm gear reduction box 101. By means of said box 101 the motor drives a countershaft 103 upon which are pulleys 105 and 107. Pulley 105, through a belt 109, drives a pulley 111. The pulley 111 drives a cam shaft 113 through a gear reduction train 115' and vacuum-operated clutch shown in general at 116 in Figs.

6, 19 and 20. Pulley 107, through a belt 115, drives a pulley 117. This pulley 117 (Fig. 3) drives a cam shaft 119 through a gear reduction train 121 and vacuum-operated clutch 122 shown in general in Fig. 21. As will appear, cams on the cam shafts 113 and 119 serve to control valves for applying suction from the manifold to various points of use throughout the machine.

Returning to the vertical shaft 95, it is for the purpose of driving an invertible turntable shown more particularly in Figs. 3, 4, 5, 13, 18 and 47. This turntable is an important feature of the invention and includes an invertible cradle beam 123. This cradle beam 123 is in the form of a hollow shaft 125 depending, by means of arms 127, from collinear bearings 129 in the frame 15. At the central portion of the hollow shaft 125 is a small gear box 131 (Fig. 18) in which is a rotary hollow shaft 133 connected through a packing gland 135 with a vacuum tube 475. The hollow shaft 133 is rotated by means of a bevel gear reduction unit 139 driven from a shaft 141 located in the hollow shaft 125. The rotary hollow shaft 133 has attached to it for rotation a small turntable 143. The upper part of the turntable carries a resilient member 145 having concentric flexible circular lips 147 for supporting and gripping the central portion of a record 240 (see Fig. 18). Member 145 may be referred to as a suction pad. It has openings 149 therein connected by means of ports 151 with the hollow shaft 133. Thus if a record rests upon the pad 145 and suction is applied to ports 149 from the tube 475, the record will be gripped and held in place against the flexible lips 147. This will be true even if the turntable 143 is inverted and even though the grip surface of the record is slightly uneven, warped or rough. Even some leakage past the lips 147 will not break the vacuum which is continuously being generated while a record is being held. The turntable 143 also includes a guide pin 153 extending through the pad 145 and above the lips 147 for centering the record 240 by means of the usual center hole formed in all standard records.

The drive shaft 141, as shown in Figs. 3, 5, 15, 16 and 47, passes out from the end of the hollow shaft 125 where it is provided with a friction drive cone 155. Clearly, rotation in either direction of the friction cone 155 will rotate the table 143 through the shaft 141, bevel gear train 139 and rotary shaft 133. Since the center line of the shaft 141 is on the center line of the hollow shaft 125, this shaft 141 may be made to revolve about the axis of the collinear bearings 129. This is done by revolving the cradle on its bearings 129. In doing so, the friction cone 155 may be brought from its downward position shown in Figs. 3, 4 and 5 to its upward position shown in Fig. 47. Such movement obviously inverts the turntable 143 180° from the Fig. 18 position, for example, to the Fig. 47 position. The collinear axes of bearings 129 are arranged to pass through the central plane of a record carried on the table 143. Hence both playing surfaces of the record come into position near a common horizontal plane when the record is in either 180° horizontal position (compare Figs. 16 or 18 with Fig. 47).

Figure 18:
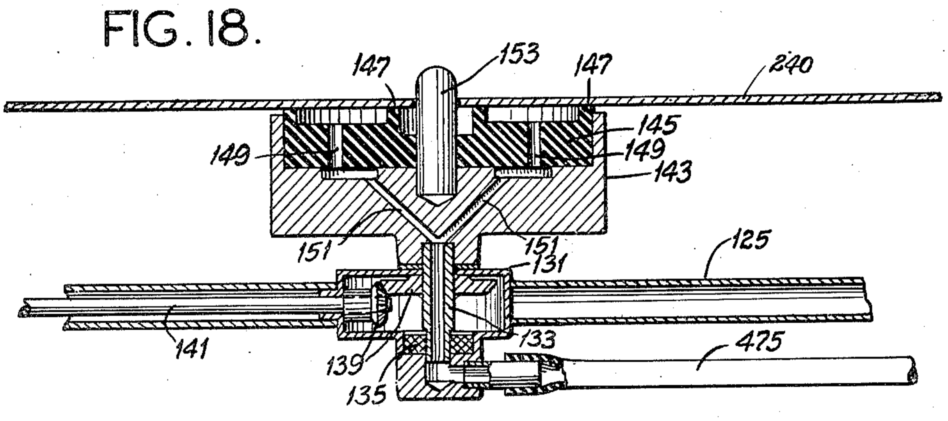
Fig. 18 is a vertical section taken on line 18—18 of Fig. 5, showing a turntable vacuum grip and turning mechanism.

When the cradle 123 is in its depending position shown in Figs. 3, 4, 5, 16 and 18, for example, the bevel cone 155 is in friction contact with a lower bevel cone 157, splined to the shaft 95. The bevel cone 157 is backed by a spring 159, reacting from a fixed collar 161 on the vertical shaft 95. Thus when the cradle 123 is down (depending) a friction drive is effected from shaft 95 through cones 157, 155, shaft 141, bevel gears 139 and hollow shaft 133 to the turntable 143. Thus the turntable when upright as shown in Fig. 18 is rotated in a given direction.

On the other hand, if the turntable is inverted around the collinear bearings 129 into an upright position such as shown in Fig. 47, the bevel cone 155 will be placed in frictional engagement with a third and upper bevel cone 163, also splined to the shaft 95. This cone 163 is backed by compression spring 165 reacting from a fixed collar 167 on said shaft 95. Thus in the inverted position of the cradle 123 the then inverted turntable 143 may be driven from shaft 95 through the bevel cones 163, 155, shaft 141, bevel gears 139, and shaft 133. Although, when the cradle is inverted, the rotation of the turntable 143 reverses with respect to the cradle 123, the rotation of the turntable when viewed along an axis from either the top or the bottom of the machine remains in the same direction, that is, with respect to the frame 15.

At numeral 169 is shown a counterweight for the cradle 123 which at least partially counterbalances it around the axis of the bearings 129. Since the friction cone 155 is outside of the side of the main frame 15 (Fig. 5) a passage 171 is provided to accommodate the 180° swing of the extending shaft 141, strength being provided by brace 173. The brace 173 is also used to support the upper end of the shaft 95 in an attached bearing bracket 174 (Figs. 3, 4 and 47). The vacuum tube 475 is flexible and accommodates to the 180° swing of the shaft 125.

One of the pintles 175 of the cradle 123 at one bearing 129 carries a pinion 177 which is driven from a sector gear 179, the latter having a rotary support 181 on the frame 15 (Fig. 3). The sector gear 179 has an arm 183 to which is pinned a connecting rod 185 reaching to a broad clevis 187 (Figs. 3, 5, 14 and 16). This clevis 187 is pivoted at 189 to the central rocker 191 of a double bellows assembly 193. This bellows assembly has two fixed blocks 195 and 197. Bellows material 199 connects block 195 with the rocker 191. A second bellows 201 connects block 197 with the rocker 191. Block 195 is fixed to the frame 15 by means of a bracket 203, and block 197 is held substantially stationary by means of pinned tie bars 205, although slight up and down movement is possible to permit 191 to rock. A vacuum connection through block 195 is shown at 207. This is connected to tube 515. A vacuum connection through block 197 is shown at 209. This is connected to tube 511. The position of the connecting rod 185 is determined by the relative pressures on opposite sides of the rocker 191. These are determined by the vacuums at connections 207 and 209.

The depending or inverted positions of the turntable cradle are thus under control of these connections 207 and 209. The stroke of the rocker 191 and of the mechanism 185, 183, 179 and 177 is such as to bring about said inversion of the cradle and turntable through 180°. Adjustable stops 211 (Figs. 3, 5 and 47) precisely determine the positions of the cradle for accurate leveling of the turntable in either its upright or inverted positions. One of the supporting arms 127 for the cradle 123 engages the stops for the purpose. Thus the records are leveled in either of their horizontal positions.

Figures 14, 15, 17, 46:
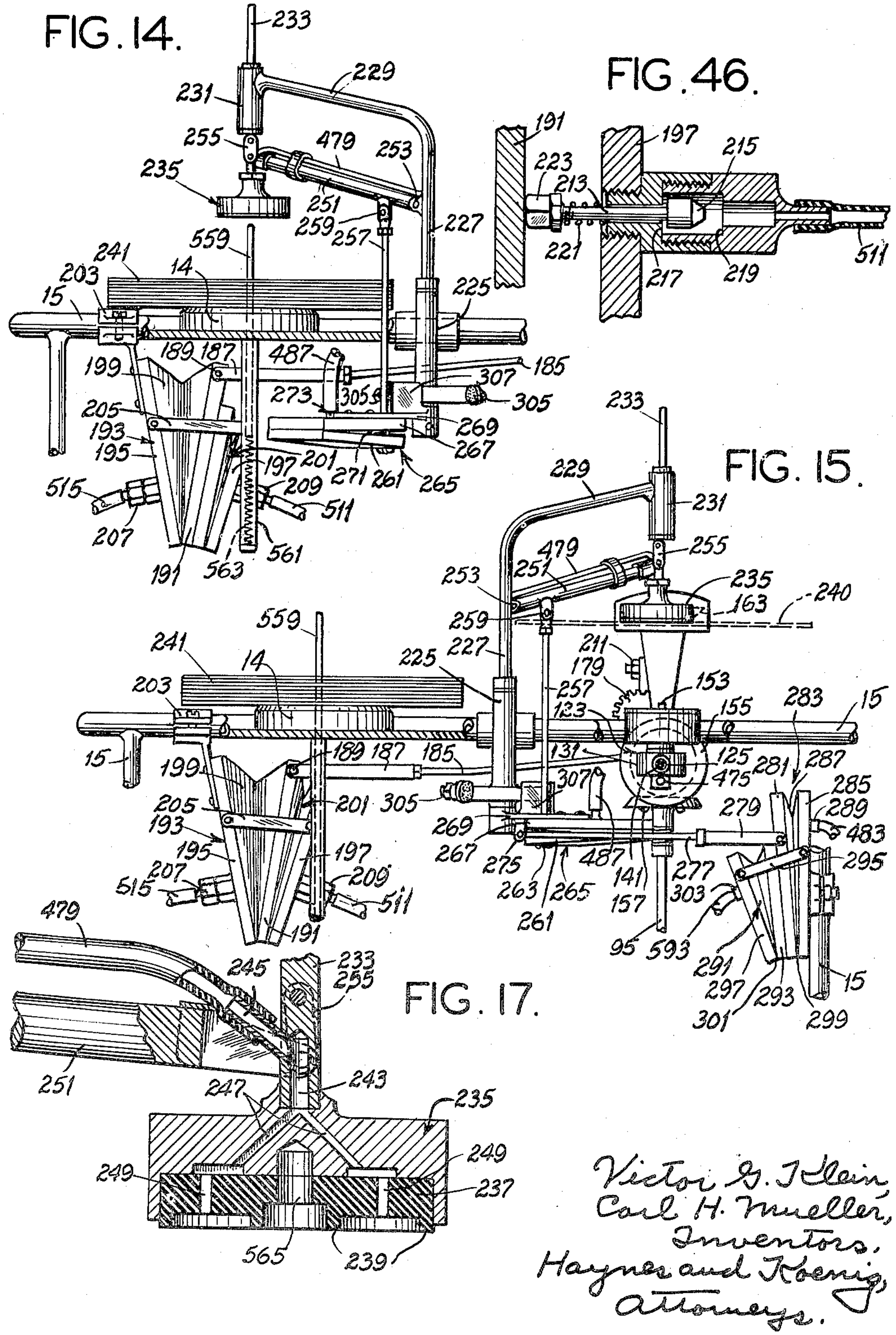
Fig. 14 is a front elevation of a transfer arm mechanism shown in a preparatory position over a record stack.
Fig. 15 is a view similar to Fig. 14 showing the transfer arm in a transfer position over a turntable.
Fig. 17 is an enlarged vertical section taken on line 17—17 of Fig. 5, showing vacuum grip means at the end of the transfer arm.
Fig. 46 is an enlarged detail section taken on line 46—46 of Fig. 3, showing a retarding valve.
Figure 16:
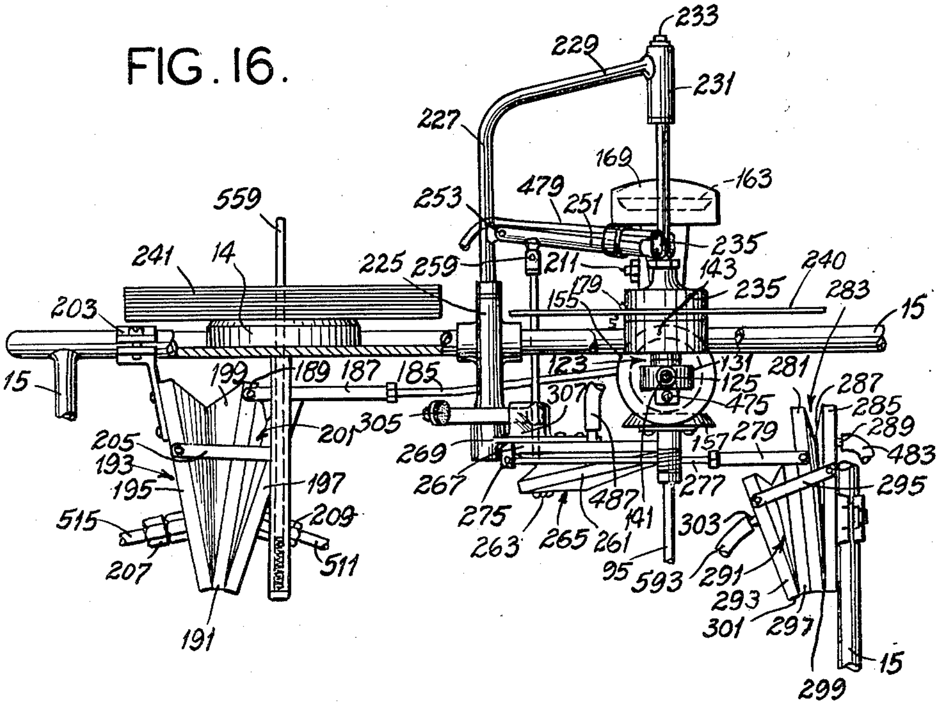
Fig. 16 is a view similar to Fig. 14 but showing the transfer arm in a position wherein a record is being applied to the turntable.

In order that the cradle 123 may not be stopped too suddenly by the limiting stops 211, each vacuum connection 207 and 209 includes a retarder valve such as illustrated in Fig. 46. Each valve consists in a valve stem 213, having a head 215 which is movable toward either of two seats 217 or 219. The valve is normally biased by means of a spring 221 toward its position adjacent seat 217. The valve spring does not prevent the generation of reduced pressure in the bellows. However, at the end of the stroke of the rocker 191 the head 223 of the adjacent valve is contacted by the rocker, thus pushing the valve toward the seat 219 and throttling the suction outlet. Hence advance of the rocker is retarded. Consequently, the advance movement of the cradle toward the ends of its movements toward the stops 211 is retarded and prevents a jolt on the record.

Carried on the frame 15 at 225 is a vertical bearing (see Figs. 3, 5, 14, 15, 16 and 17), which rotatably supports a vertical arm 227 bent to form a reach rod 229. At the end of 229 is a vertical bearing 231. The bearing 231 carries a plunger 233 at the lower end of which is a suction cup 235. In cup 235 is a suction pad 237 made of suitable resilient material for the purpose. This pad also has concentric resilient circular lips 239 for contacting the upper surfaces of successive records to be taken from a stack on table 13, such as indicated at 241 in Fig. 3. Details of the suction cup are in Fig. 17.

The end of the plunger 233 is hollow, as indicated at 243, and has a nipple connection 245 with a flexible suction line 479. The hollow portion 243 is in communication through ports 247 with passages 249 through the pad 237. Thus if the suction cup 235 be applied to the upper surface of a record and a vacuum is applied to the nipple 245 from line 479, a record may be gripped and picked up. The advantages of this type of suction grip have been described above in connection with the suction grip 145 for the turntable 143 and need no repetition.

The plunger 233 is reciprocated by means of an arm 251 which is pivoted to the vertical arm 227 at 253. The outer end of the arm 251 is articulated to the plunger 233 by means of a connecting link 255. Thus if the arm 251 is raised or lowered, the suction cup 235 likewise will be raised or lowered.

The arm 251 is raised and lowered by means of a connecting rod 257 pivoted at 259 to the arm 251 (see Figs. 3, 4, 14, 15, 16 and 51). This rod 257 at the lower end is pivoted to a rocker 261 (see pivot 263). The rocker 261 forms part of a suction bellows indexed generally as 265. This bellows has a block 267 (stationary with respect to rocker 261) which is attached to a rotary bracket 269. Bracket 269 is attached to the lower end of the rod 227 and swings therewith. A hole 268 in the bracket accommodates passage of the connecting rod 257. This bellows is also provided with bellows material 271 and has a suction inlet at 273 for vacuum line 487. By applying a vacuum to the bellows through line 487 the rocker 261 may be raised from the Fig. 3 position to the Fig. 14 position, thus raising the plunger 233 and the suction cup 235. Thus an attached record may be lifted.

The purpose of the bent arm 227, 229 is, after the suction cup 235 has been raised with a suspended record, to swing from a position over the stack of records 241 to a position over the turntable 143. To accomplish this rotation, an off-center pivot 275 is placed on the lower bracket 269. Connected at this pivot 275 is a connecting rod 277 which reaches to a clevis 279 attached to the rocker 281 of a bellows shown generally at 283. This bellows has a fixed block 285 connected with the rocker 281 by means of bellows material 287. A suction inlet for this bellows is shown at 289 for suction line 483. A second and smaller bellows is shown at 291 connected with the bellows 283. This smaller bellows has a substantially fixed block 293 held in position by bars 295. Its rocker 297 is attached to the rocker 281 of the larger bellows 283. Some play in block 293 allows full rocking of blocks 281 and 297. The rocker 281 is pivoted to the block 285 at hinge 299. The rocker 297 (movable with the rocker 281) is pivoted to the block 293 at hinge 301. Any slight upward movement required of the block 293 by the hinging action at 299 and 301 is accommodated by slight swing of the bars 295. The bellows 291 has a suction inlet 303 on its block 293 for vacuum line 593. Essentially, the organization of the bellows 283 and 291 comprises a differential pressure bellows in which the larger area of the rocker 281 exposed to pressure is designed to give a greater force than the smaller area of the rocker 297 when exposed to the same pressure, whereby the action of the bellows 283 will overcome action of the bellows 291 under equal pressure conditions. As will appear later, the action of the small bellows 291 is to reopen the large bellows 283 after vacuum in the latter has been broken. A spring or a weight might also be used for the purpose.

In order that the action of the rocker 281 in swinging the arm 229 may be limited, the fixed bearing 225 is provided with two angularly related adjustable stops 305 cooperating with an extension 307 (see Figs. 5, 14, 15, 16 and 51). This is in the form of a rib extending upward from the median line of the bracket 269 to a height sufficient to contact the opposite stops 305 at each desired end of the travel of arms 251 and 229.

Figure 12:
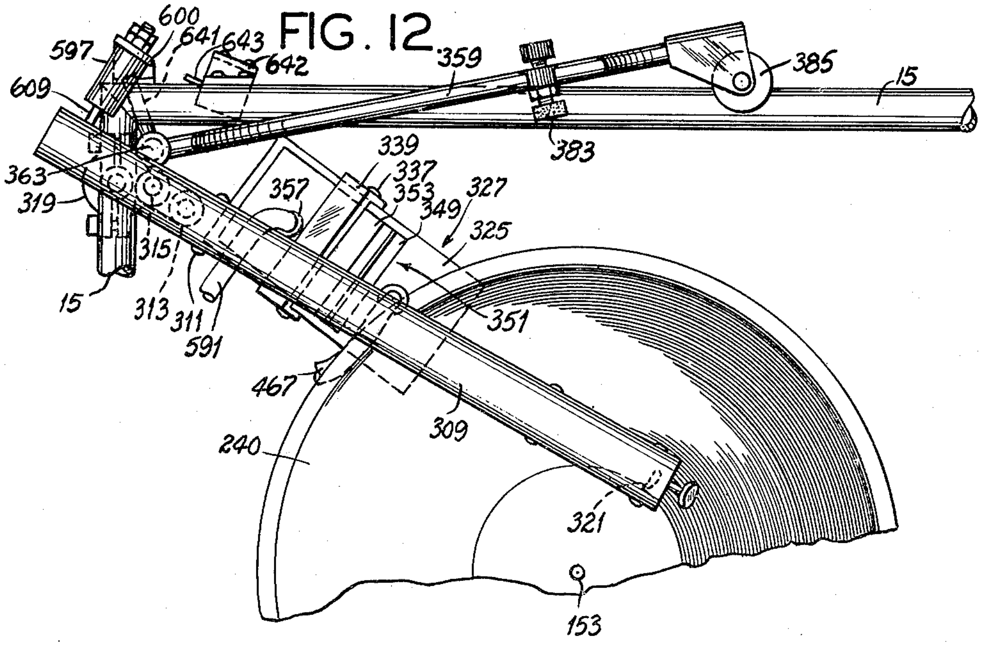
Fig. 12 is a view similar to Fig. 11 showing the tone arm in position near the end of the playing of a record.
Figure 13:
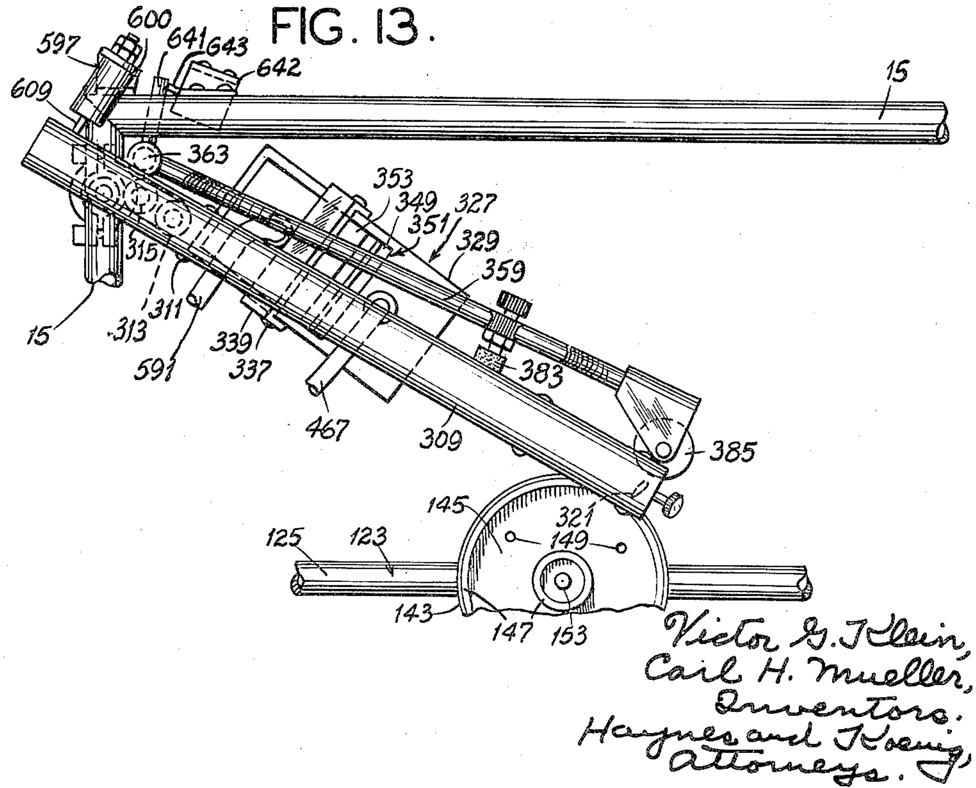
Fig. 13 is a plan view of the tone arm showing it in position for final automatic stopping of the machine after a playing sequence.

At numeral 309 (Figs. 1, 3–5 and 7–13) is shown a tone arm pivotally mounted at 311 on a post 313 from which extend vertically collinear bearings 315. These bearings are carried in collinear sockets 317 in a bracket 319 clamped to the frame 15. The sockets 317 are on a practically, but not exactly, vertical axis, the axis being tilted enough so that gravity will bias the tone arm to drift from a position such as shown in Fig. 13 to a return position such as shown in Fig. 8. The tone arm per se is of ordinary construction, carrying a needle pickup, crystal, and suitable wiring for connection into the circuit of the apparatus in cabinet 9. Details of these connections are not necessary since they are made according to known sound pickup systems. The tone arm needle is shown at 321.

Figure 7:
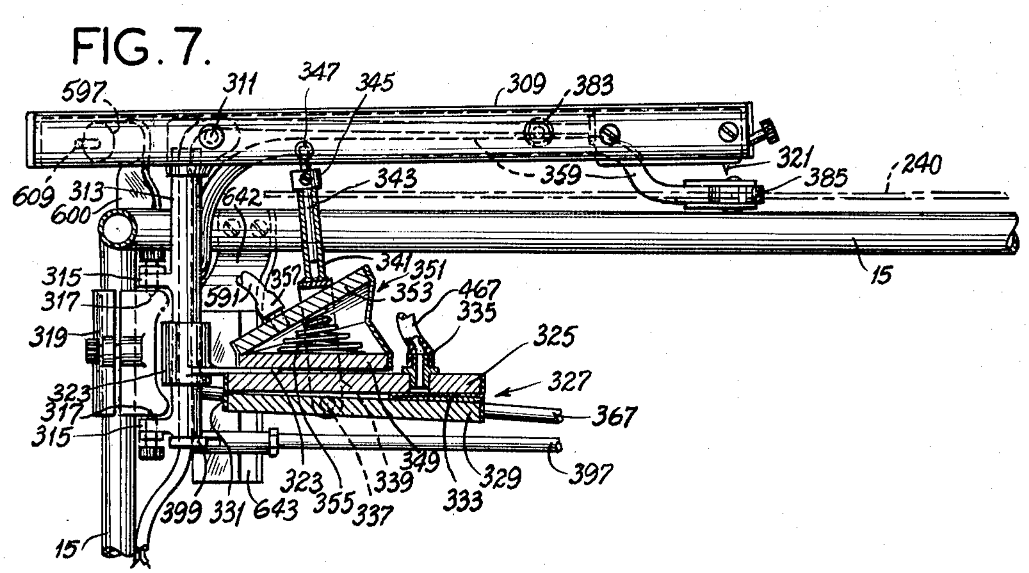
Fig. 7 is a vertical section taken on line 7—7 of Fig. 5, showing a tone arm in a raised safe position.
Figure 8:
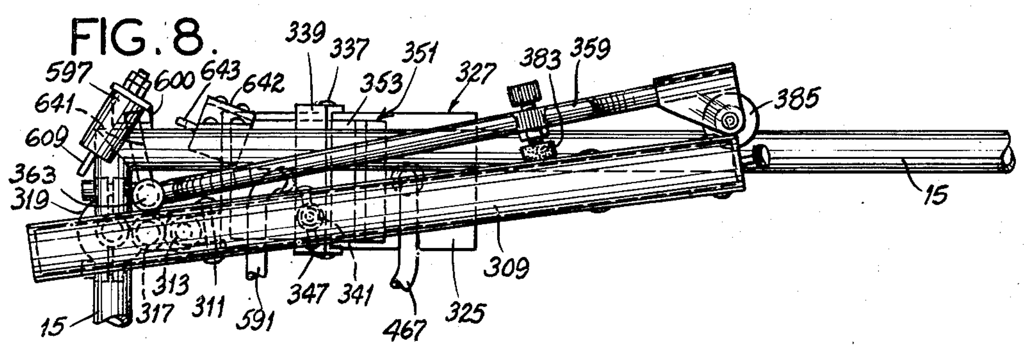
Fig. 8 is a plan view of Fig. 7.

In order to raise and lower the tone arm around the pivot 311, we provide at the lower end of the post 313 a bracket 323 which supports a block 325 of bellows 327, the latter having a rocker 329 swinging on a hinge 331 (see Figs. 4 and 7). This bellows has the usual bellows material 333 connecting the rocker 329 and the block 325. A suction inlet is shown at 335 on the block for a vacuum line 467.

Pivoted to the rocker at 337 is a clevis 339. On the upper end of the clevis is a tube 341 in which slides a rod 343, the latter being limited in its movement with respect to the tube 341 by an adjustable collar 345. The upper end of the rod 343 is pivoted at 347 to the tone arm. The parts 341, 343 and 345 provide a lost-motion connection between the tone arm 309 and the rocker 329. Thus when the rocker 329 is raised by applying vacuum at connection 335 (see Fig. 10), there is a period of lost motion after which the tube 341 pushes up the collar 345, thus raising the tone arm 309. On the other hand, when the rocker 329 descends, the tone arm drops, but if the downward motion of the tone arm is arrested, as by coming into contact with a record surface, the rocker 329 may descend further without forcing the tone arm. This is because of the lost motion (see Fig. 9). This latter action assures that the only pressure of the needle on either side of the record is due to the weight of the tone arm only, assuring long record life and consistent tone reproduction.

Above the block 325 is fastened a block 349 of a safety bellows 351 which has a rocker 353 (see Figs. 7 and 8). A spring 355 within the bellows biases the rocker 353 upward so that it tends to engage the top of the clevis 339. This tends to raise the clevis 339 and to hold tone arm 309 at a safe elevation. However, the rocker 353 includes a suction connection 357 whereby, as long as a vacuum is applied to the bellows 351, the rocker 353 will be down and inoperative to hold up the tone arm (see Fig. 10). Under these conditions, the spring 355 is compressed. This is a safety feature. It causes the tone arm to lift up into a maximum clearing position whenever the vacuum breaks accidentally, such as because of a broken line, broken electric circuit, of even ordinary stoppage of the machine. Thus whenever the machine is inoperative, the tone arm will automatically be raised into its safe position.

Figure 9:
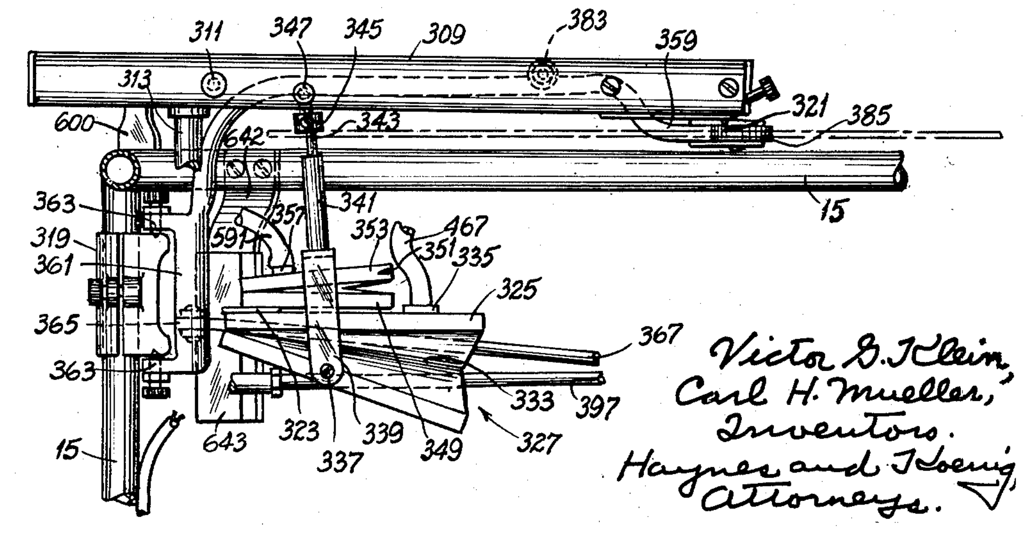
Fig. 9 is a view similar to Fig. 7 with the tone arm in a depressed position to play a record.
Figure 10:
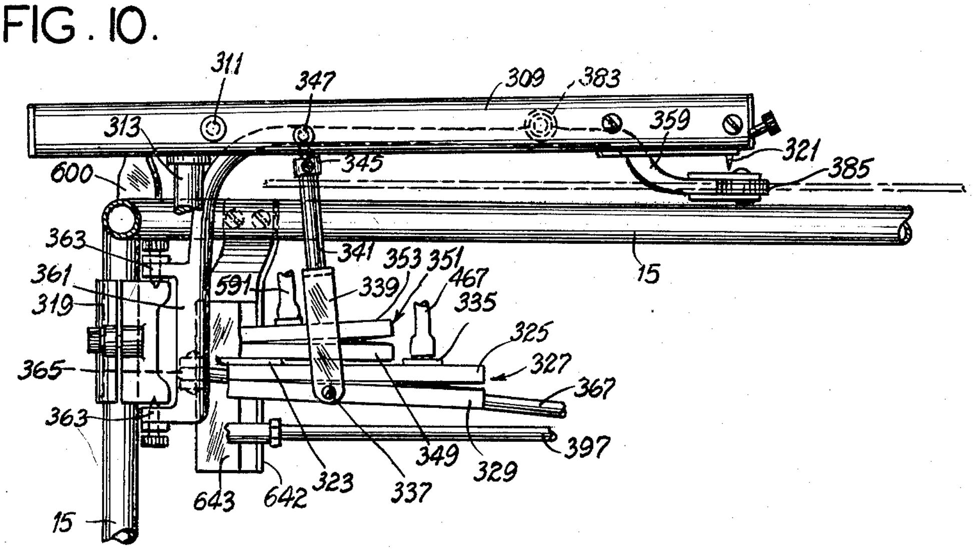
Fig. 10 is a view similar to Fig. 7 with the tone arm in a position for advancing to or receding from a record.
Figures 11, 39:
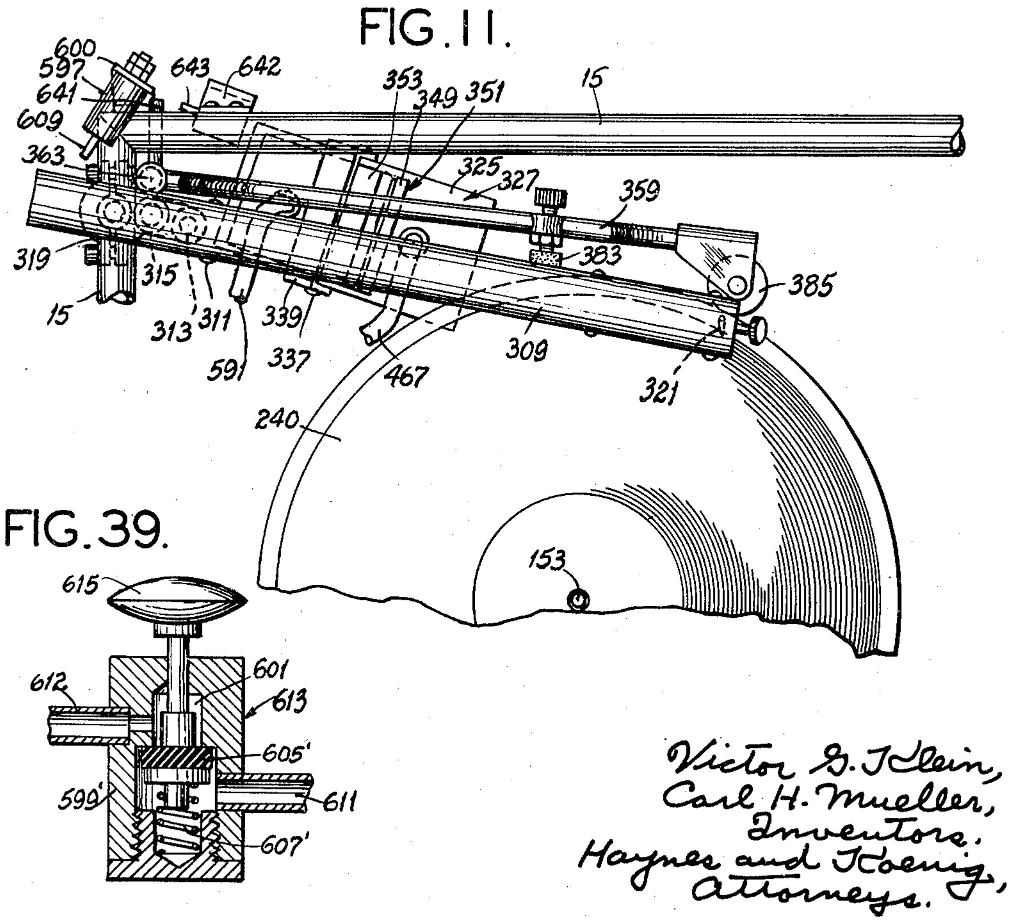
Fig. 11 is a plan view similar to Fig. 8, showing the tone arm in a position starting to play a record.
Fig. 39 is an enlarged detail section of a reject control valve.

In order to swing the tone arm horizontally in from a position such as shown in Figs. 1, 4, 5 and 8, to a position near the edge of the record, such as shown in Fig. 11, a tone arm driving mechanism is used. This consists of a horizontal push bar 359 more or less paralleling the length of the tone arm 309 and formed with a vertical post part 361. The latter is carried on vertical pivot bearings 363 also supported on the aforementioned bracket 319 on the frame 15. In Figs. 9 and 10 the post 313 is broken away more clearly to show the second vertical post 361 which is directly behind the post 313.

A lateral arm 365 at the bottom of the post 361 is pivoted to a connecting rod 367 which at 369 is pivoted to a bearing bracket 371 attached to a rocker 373 of a bellows 375. This bellows has a fixed block 377 carried on a bracket 379, also attached to the frame 15. This bellows has a suction connection 381. When a vacuum is applied to the bellows through the connection 381, the rocker 373 drives the mechanism 367, 361 to move the push bar 359 from the position shown in Fig. 8 to the position shown in Fig. 11. For contact purposes between the push bar 359 and the tone arm 309 an adjustable resilient pad 383 is used. The outer end of the push bar 359 carries a contact wheel 385 which is located in a plane adapted to contact the edge of a record 240 after a certain travel of the push bar. How the plane of the contact wheel 385 is coplanar with that of the record is shown in Fig. 7.

Although, as above stated, the bearings 315 for supporting the tone arm are slightly non-perpendicular to the extent that the tone arm seeks to return to the Fig. 8 position, it is desirable that this return action be made positive. For this purpose, another bellows 387 is provided (see Fig. 4), having as a base block said block 377 of the bellows 375. This bellows 387 has a rocker 389 with a vacuum connection at 391 to line 497. The rocker 389 also has a bracket 393 which through an eye 395 has a lost-motion connection with a connecting rod 397. Connecting rod 397 reaches to an arm 399 at the lower end of the post 313. The lost-motion connection at the eye 395 allows the bellows 375, through 367, 361 and pusher bar 359, to move the tone arm in from the Fig. 8 to the Fig. 11 position. It also allows playing swing of the tone arm. Then closure of the bellows 387 will, through connecting rod 397, effect positive return of the tone arm toward its initial Fig. 8 position. The push bar 359 will by this time have returned by opening action of bellows 375, as will be made clear.

Figures 19, 20:
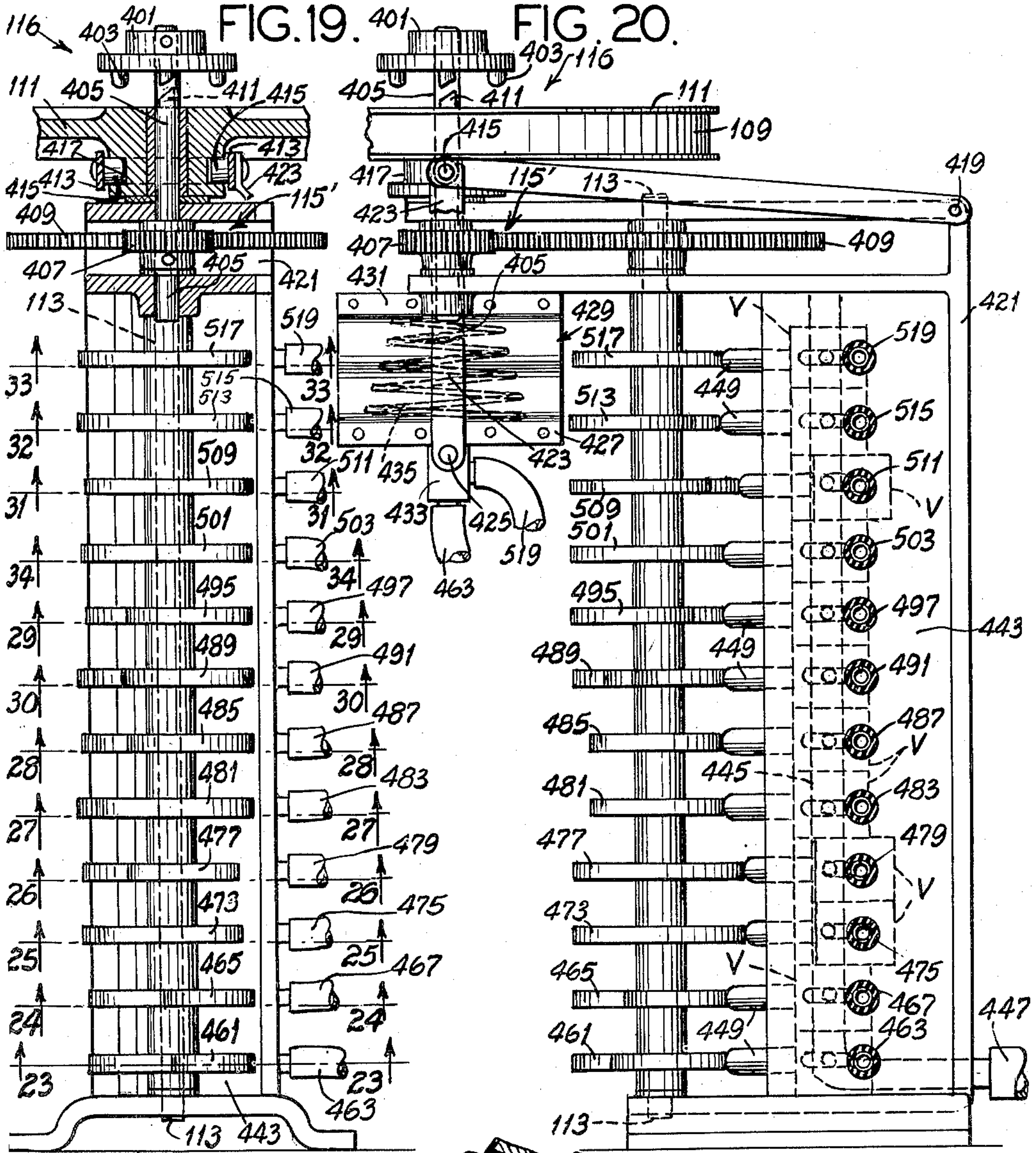
Fig. 19 is an enlarged vertical section taken on line 19—19 of Fig. 6, showing one pneumatic control cam mechanism for controlling ordinary operation.
Fig. 20 is a right side view of Fig. 19.
Figure 51:
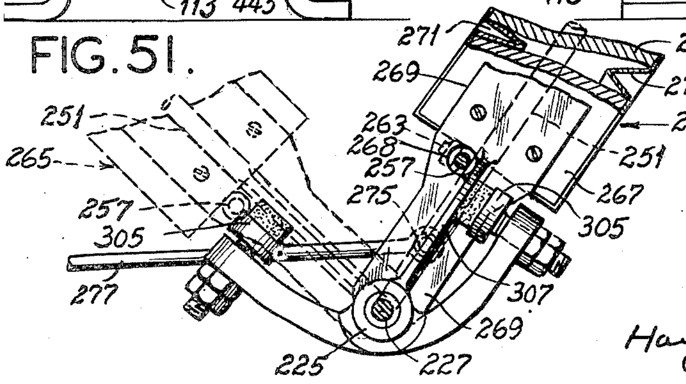
Fig. 51 is an enlarged horizontal section taken on line 51—51 of Fig. 3.

Clutch 116, above mentioned for connecting the motor drive to the cam shaft 113 (Figs. 19 and 20), consists of a toothed crown 401 pinned to the cam shaft 113. The teeth are shown at 403. The pulley 111, as shown in Fig. 19, is normally freely rotary on a countershaft 405. The latter carries a driving pinion 407 meshed with a gear 409 on the cam shaft 113. Gears 407 and 409 constitute the gear train 115', above mentioned. The pulley 111 is slidable axially on the shaft 405 and carries a tooth 411 engageable and disengageable with one of the teeth 403 on the crown 401. Engagement is effected by moving the pulley 111. Movement is brought about by a forked member 413 having gudgeons 415 extending into a groove 417 of the pulley 111. The fork 413 is pivoted at 419 to a support 421 for the cam shaft 113. The fork 413 has pivoted to it a connecting rod 423 which reaches to a pivot 425 on a rocker 427 of a bellows 429. The fixed block of the bellows is shown at 431. Its suction connection is at 433 wherein three lines 463, 519 and 617 enter. When a reduced pressure is applied to the bellows 429 it collapses, thus through the connecting rod 423 and fork 413 causing closure of the clutch at teeth 403, 411. The clutch will remain shut as long as the bellows 429 is evacuated. An expansion spring 435 in the bellows 429 serves to expand it when the vacuum is broken, thus causing opening of the clutch 116.

Referring to Figs. 3, 4, 6 and 21, a similar clutch 122 is shown for the cam shaft 119. In this case the pulley 117 is freely rotary on a countershaft 437, carrying a pinion 439 driving a gear 441 on the cam shaft 119. The clutch 122 is made up of parts which are functionally the same as those of the clutch 116 already described, and in order to avoid unnecessary repetition the parts thereof have been likewise numbered. However, this clutch 122 is under control of a bellows 403 (like bellows 429) having a fixed block 432 and a rocker 428, the latter having a suction connection 434 into which the line 575 enters. The operative connecting clevis between the bellows and the clutch mechanism is shown at 424. An expansion spring 436 in the bellows 430 (Figs. 3, 49 and 50) serves to expand it when the vacuum is broken, thus causing opening of the clutch 122. The operation of clutch 122, in response to suction operation of the bellows 430 is similar to that described in connection with clutch 116 and bellows 429 except that in this case the cam shaft 119 is set into operation.

Figure 23:
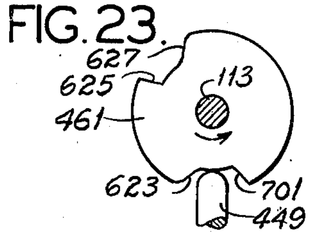
Figs. 23 to 34 are diagrammatic detail sections taken on lines 23—23 to 34—34 respectively on Fig. 19 and showing in starting positions certain operating cams.
Figure 24:
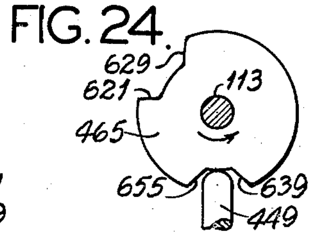
Figure 25:
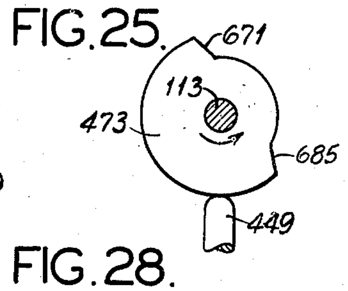
Figure 26:
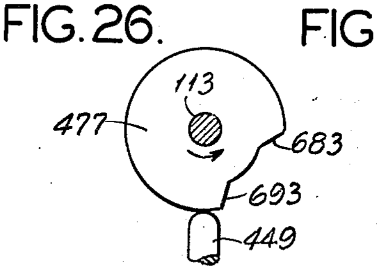
Figure 27:
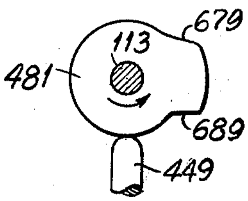
Figure 28:
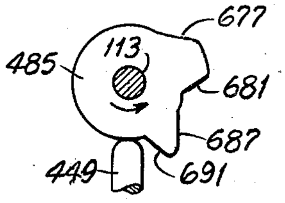

The cam shaft 113 and the cam shaft 119 each carry a series of cams which individually operate individual D-valves, one of which is detailed for example in Fig. 22. The group of valves on cam shaft 113 is associated with a manifold block 443 (Fig. 20) having a vacuum manifold 445 connected through line 447 with the suction manifold 51. Thus whenever the vacuum pump 19 is operating there will be a vacuum in the valve manifold 445. Cooperating with the manifold block 443 are valves operating in adjacent planes, one of which is shown for example at V in said Fig. 22. It should be noted that Fig. 22, like Fig. 23, is taken on line 23—23 of Fig. 19. Each such valve V is operated by a follower 449 which is controlled by one of the cams to be described. A return spring 451 is associated with each follower 449. Each valve V controls a pair of ports 453 and 455. Ports 453 pass to the manifold 445 and the respectively adjacent ports 455 pass to various tubes which will be detailed below. When a follower 449 is driven outwardly from a cam center, the respective D-valve V connects the manifold 445 with one of the adjacent suction ports 455 to transmit vacuum to the respective tube to be described. When the follower is allowed to move in on the cam, the respective valve V vents the respective port 455 into a space 457, which is vented to atmosphere in all cases. As to cam shaft 119, the individual valve constructions associated with each cam are similar. The same is true in the case of cam shaft 113.

In Figs. 19 and 20 are shown all of the cams and all of the suction lines associated with cam shaft 113, said suction lines being the ones which are controllably to be connected with the suction manifold 445. The latter carries a constant reduced pressure as generated by the pump 19 under control of the regulator 55.

Figure 50:
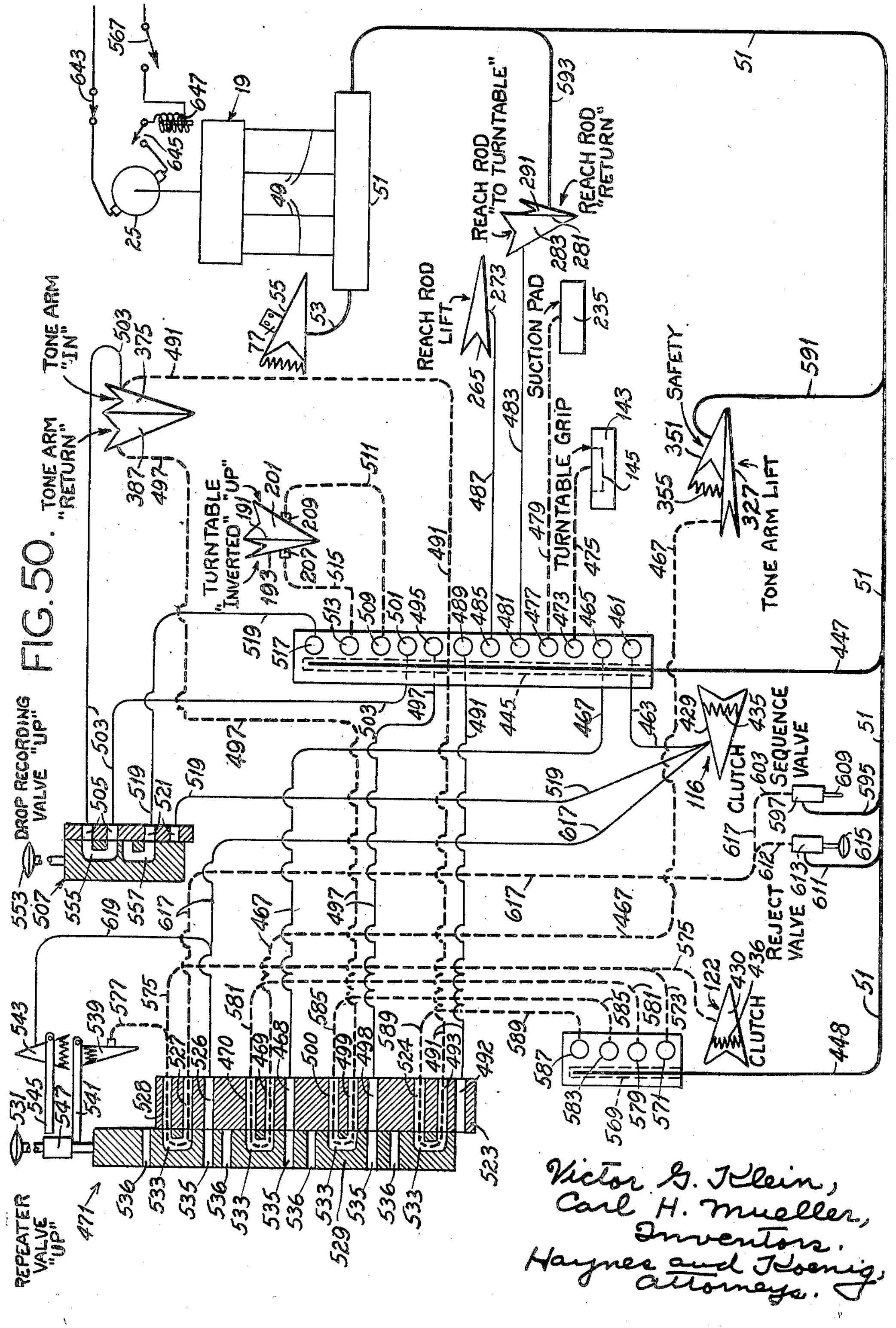
Fig. 50 is a view similar to Fig. 49 for repeating operation.

Starting at the bottom of Figs. 19 and 20, the first cam 461 (also shown in Fig. 23) operates one of the valves V which controls a suction line 463 which passes to the bellows 429 for operating the clutch 116 (see also Figs. 49 and 50). It will be recalled that this clutch is the one which applies motion to the cam shaft 113 from the pulley 111. The method of initially closing the clutch will appear. The cam 461 maintains clutch engagement after engagement has once been made in a manner to be described. This may be referred to as a clutch-holding cam for maintaining rotation of the shaft 113 after it has once been started by another means.

Next on shaft 113 is cam 465 which controls the vaccum in a line 467, the latter leading through ports 468 and 469 of a repeater valve 471 (shown in Figs. 41 and 42 and the function of which will later be described). Ultimately the suction line 467 leads to the tone arm lift bellows 327.

The next cam 473 controls a suction line 475 leading to the turntable grip 145 (see Fig. 18).

Cam 477 controls a suction line 479 leading to suction pad 235 (see Fig. 17).

Cam 481 controls a suction line 483 which passes to the bellows 283 which controls the swing of the arm 229.

Cam 485 controls the suction line 487 leading to the bellows 265 which controls the lift of arm 251.

Cam 489 controls the suction line 491 which leads through ports 492 and 493 in said repeater valve 471 and passes to the bellows 375 which controls the push bar 359 for operating the tone arm 309.

Cam 495 controls a suction line 497 which passes via ports 498 and 499 in said repeater valve 471 to the bellows 387 which controls the return action of the tone arm 309.

Cam 501 controls a suction line 503 which passes through ports 505 of a control valve 507 (Fig. 43) for playing "drop" recordings, and thence to the bellows 375 which controls the playing movement of the tone arm.

Cam 509 controls a suction line 511 which passes to one side of the bellows 193 for positioning the turntable in upright position.

Cam 513 controls a suction line 515 which controls the side of the bellows 193 for moving the turntable into inverted position.

The last cam 517 controls a suction line 519 which passes through ports 521 of said "drop" recording control valve 507 and then to the clutch bellows 429.

The forms of the cams 461, 465, 473, 477, 481, 485, 489, 495, 501, 509, 513 and 517 are shown respectively in Figs. 23–34 in proper shape and angular relationship for the functions later to be described. It will be noted that, in the position of the "drop" recording valve 507 shown in Fig. 49, the ports 521 are out of communication. When they are in communication (Fig. 43) the line 519 is adapted to cause a suction in the bellows 429 which controls the clutch 116 for operating the cam shaft 113.

Before describing the operation, the details of the repeater valve 471 (Figs. 41, 42, 49 and 50) and the "drop" recording valve 507 (Figs. 43, 49 and 50) will be given. The repeater valve 471 consists in a block 523 in which are ports 492, 493, 498, 499, 468 and 469 with additional ports 470, 524, 526, 500, 527 and 528 (the function of the latter to be described later), all of which are under control of a slide block 529 manually moved by means of a button 531. The slide block has D-valve ports 533 which in the position of the valve shown in Fig. 41 are adapted to connect the pairs of ports 526, 527; 468, 469; 498, 499; and 492, 493. When the slide 529 is moved into the position shown in Fig. 42, the members of said pairs of ports are respectively cut off from one another. Then port 527 is connected to port 528; port 469 is connected to port 470; port 499 is connected to port 500; and port 493 is connected to port 524. Atmospheric relief ports 535 in the slide block and its end 537 serve to connect to the atmosphere ports 526, 468, 498 and 492, as shown in Fig. 42. Relief ports 536 in said slide in the Fig. 41 position connect with relief ports 528, 470, 500 and 524. The purpose of the ports 526, 527 and 528 is partly to control an interlock for the control button 531.

Figures 41, 42:
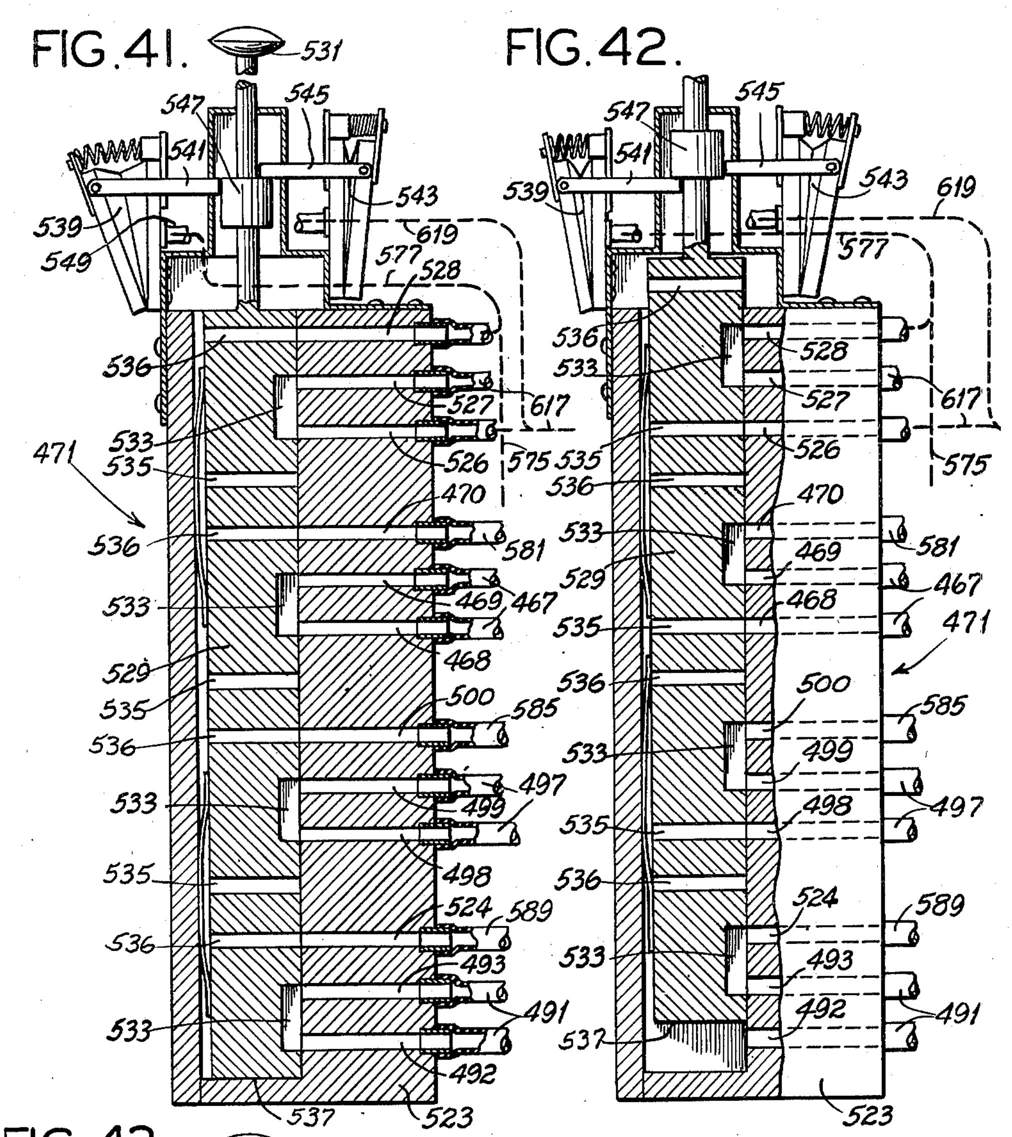
Fig. 41 is an enlarged longitudinal section of a repeat control mechanism.
Fig. 42 is a broken-away view, similar to Fig. 41, but showing an alternative position of parts.

As shown in Fig. 41, a spring return bellows 539 is used for controlling an interlock bar 541 and a spring return bellows 543 is used for controlling another interlock bar 545. The bars 541 and 545 cooperate with a collar 547 on the stem of the "manual" control button 531. Thus, when the slide 529 is in the Fig. 41 position, the bellows 539 is relieved through a connection 549 and line 577, and suction is applied to the bellows 543. This causes the interlock rod 545 to prevent the operator from pulling out the button 531.

In the position of the slide 529 as shown in Fig. 42, suction is applied to the bellows 539 over line 577 and bellows 543 is relieved over lines 619, 617, and ports 526 and 535. Thus interlock pin 545 is withdrawn and 541 is inserted below the collar 547 preventing pushing in of the button 531.

Figure 43:
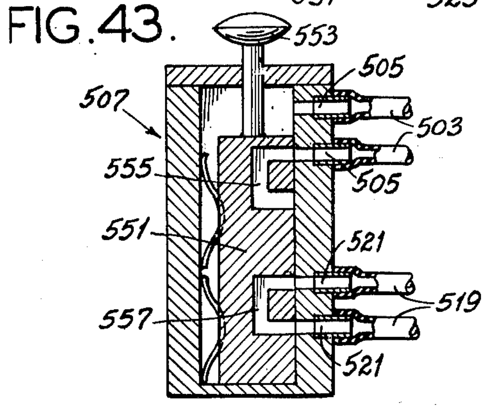
Fig. 43 is an enlarged longitudinal section of a control valve for "drop" recordings.

In Fig. 43 is shown what has been referred to as the "drop" recording valve which is simply a slide 551 operated from a button 553. In the slide 551 are two D-valves 555 and 557. The former controls ports 505 and the latter ports 521. There is no relief function in this valve.

It is simply an alternative double shut-off valve for the lines 503 and 519.

Referring to Figs. 21 and 35–38, there are illustrated the cams on the cam shaft 119. These are associated with valves similar to valves V shown typically in the typical Fig. 22, but the valves associated with these cams operate in connection with a manifold 569. Connections are as follows (see also Figs. 49 and 50):

The lowermost cam 571 controls suction line 573 which passes to port 528. There is also a branch connection 575 from line 573 to the bellows 430 which through clutch 122 controls the operation of cam shaft 119. There is also a branch line 577 passing to the interlock bellows 539.

A second cam 579 controls the vacuum line 581 which passes to the port 470. The third cam 583 controls a vacuum line 585 which passes to port 500.

The fourth cam 587 controls a vacuum line 589 which passes to port 524.

The details of the shapes and relative angles of all the cams are shown in Figs. 23–38, respectively.

Referring to Fig. 49, the operation of the apparatus for playing "manual" recordings will now be described in a series of steps which will be outlined in Roman numerals. "Manual" recording, it will be recalled, is one in which a sound sequence is recorded in a given series of records on one side of the first record, then on its opposite side; then on one side of the next record, and then on its opposite side etc. throughout the series. Any desired number of records within the capacity of the machine having any of various record diameters within its capacity are stacked according to the playing sequence desired. In the case of a "manual" recording, say of a symphony, the proper sequence will be indicated on successive opposite sides of records as parts 1, 2, 3, etc. Where records are unorganized according to a sequence, the operator simply selects the records and stacks them so that the sequence of the planes of the recordings is according to the sequence of sound that he wants. Thus the stacking is quite easy.

*Step I*

The top record of the stack is manually placed on the turnable 143 (see Fig. 1). The remainder of the stack is placed on the raised portion 14 of the table 13 (Fig. 3). This raised portion 14 facilitates placing and removing the records. The operator at this time has manually moved up the arm 251 (Fig. 14) and swung the arm 229 clear (Fig. 15). For the purpose of aligning the record stack, a pin 559 slides through the table 13 and is supported in a closed tube 561 in which a spring 563 normally biases the pin upward, as shown in Figs. 14 and 15.

Next, the operator returns the arm 229 from the Fig. 15 to the Fig. 14 position and releases the arm 251 so that it drops to the Fig. 3 position. The central portion of the record grip suction pad 237 (Fig. 17) has a recess 565 which receives the end of the pin 559 and depresses it against said spring 563.

The operator next turns the current on at a main switch 567 (Figs. 1 and 49). Switches 645 and 643 shown are presumed to be closed. Their functions will appear. This energizes the motor 25 which drives the pump 19 which evacuates the manifold 51. This produces a vacuum at all of the points indicated by heavy lines in Fig. 49. Vacuum passes to the bellows 291 via line 593.

This collapses said bellows 291 and moves the bellows rockers 297 and 281. Connecting link 277 causes the arm 229 to be angled into position over the record stack, as shown in Fig. 3. Vacuum is also delivered to the manifold ports 445 and 569 (Figs. 22 and 49) thus serving all of the cam-operated valves V, operated by the cams shown in Figs. 23–38. However, at this time the cam shafts 113 and 119 are not rotating. In addition, vacuum progresses over line 591 to the bellows 351 which releases the tone arm 309 from its upward safe held position such as shown in Fig. 7. The bellows collapses against the action of its inside expansion spring 355. This is not a lowering of the tone arm onto the record but a mere releasing of it from its extreme safe position.

Figure 40:
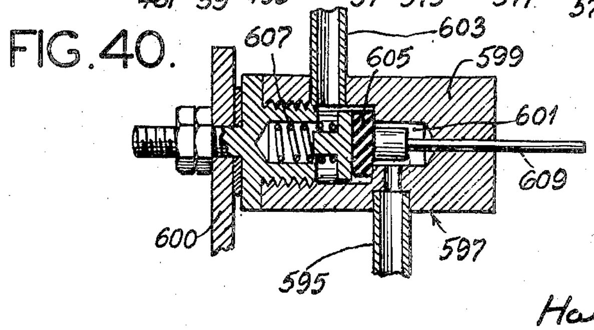
Fig. 40 is an enlarged detail section of an automatic sequence valve.

Vacuum also progresses over line 595 to a sequence valve 597, the details of which are shown in Fig. 40. This valve comprises simply a case 599 attached to a bracket 600 on the frame 15, in which is a port 601 separating the line 595 from a line 603. Line 603 connects with line 617. The valve part per se is numbered 605 and is biased by a spring 607 to a closed position. It has an outward, responsive stem 609 which is adapted to be contacted by the rear swinging end of the tone arm 309 when the needle of the latter reaches the innermost portion of a record groove. Under the latter conditions the sequence valve 597 opens (see also Figs. 3, 7, 8 and 10–13).

Vacuum is also applied over line 611 to a reject valve 613 (shown in Fig. 39) which is a simple on-off valve having a finger button 615 for "manual" operation to open. Its valve part 605' per se controls the line 611 with respect to a line 612. The latter leads to line 617 as in the case of the sequence valve above. This valve has a case 599' and a return spring 607'.

It will be assumed that both cam shafts 113 and 119 are in zero reference position corresponding to Figs. 23–38. Under such conditions the valve operated by cam 473 (Fig. 25) is open, thus evacuating line 475 (Fig. 49) and causing the turntable grip 145 to grip the record which, as above stated, has been manually placed thereon.

The valve associated with cam 477 is also open (Fig. 26), which evacuates line 479 and causes the record grip 235 on the end of the pick-up rod 233 to grip the uppermost record on the stack on the table, ready to move it into playing position when required.

The valve associated with cam 509 (Fig. 31) at this time is also opened to the evacuating line 511 to the bellows 201 which moves the rocker 191 to the position wherein the connecting rod 185 and gear train 179, 177 will cause the turntable cradle 123 to be held in its upright position. Thus the turntable 143 will be held upright as in Fig. 18.

Next the operator in the usual way places the needle of the tone arm 309 on the record for playing and playing occurs, as the record will be revolving at proper playing speed through action of drive 99, 97, 95, 157, 155, 141, 139 (Figs. 3, 6 and 18).

*Step II*

When playing has been completed, the tone arm has been angled to a position where its rear end touches the stem 609 of the sequence valve 597 which connects the line 595 from suction manifold 51 with lines 603 and 617 leading through ports 527 and 526 of the repeater valve 471 to the bellows 429, which upon collapse causes the clutch 116 to close. This rotates the cam shaft 113 for subsequent sequential valve action by the various cams.

*Step III*

As soon as the cam shaft 113 starts to rotate, cam 461 (Fig. 23), by means of a rise 623, opens its valve, connecting the vacuum manifold 445 with the bellows 429 (see line 463) which acts to hold in the clutch 116, even though the tone arm should (as it will) recede from the contact with the sequence valve 597. In other words valve 597 is by-passed. Thus temporary operation of valve 597 initiates subsequent automatic valve operation. At this time the vacuum in the bellows 429 is also transmitted over lines 617 and branch line 619 to the interlock bellows 543, thus collapsing it and causing the interlock bar 545 to move over collar 547 (see also Fig. 41). The object of this is to prevent the operator from immediately pulling out the button 531 (which is for repeat cycle operation) while a record is being changed or turned over. This interlock is effective only while the cam shaft 113 is rotating.

*Step IV*

The cam 465 (Fig. 24), by means of a rise 655, opens its valve to evacuate line 467 which evacuates bellows 327 for lifting the tone arm 309 to a position such as shown in Fig. 10, wherein the needle is above the plane of the record.

*Step V*

Next, cam 495 (Fig. 29), by means of a rise 657, opens its valve to evacuate line 497, which evacuates the bellows 387. Bellows 387, through the link 397, sweeps the tone arm 309 to its starting position. It finally comes up against the push bar 359, as shown in Fig. 8.

*Step VI*

Figure 29:
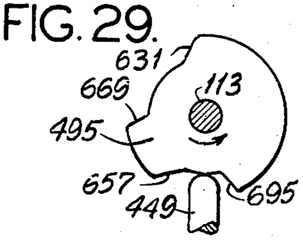
Figure 30:
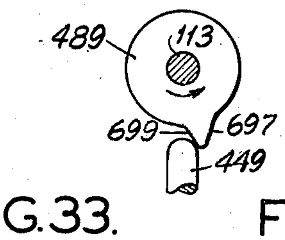
Figure 31:
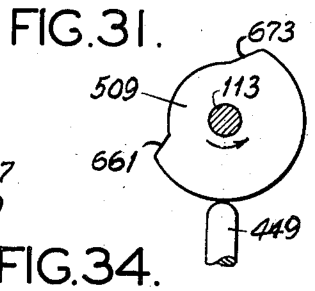
Figure 32:
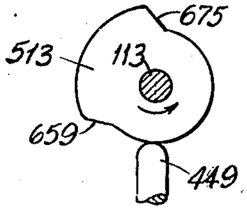
Figure 33:
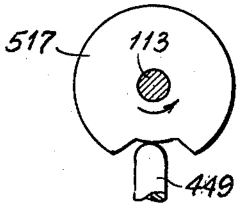
Figure 34:
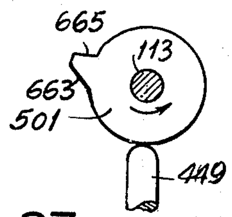
Figure 35:
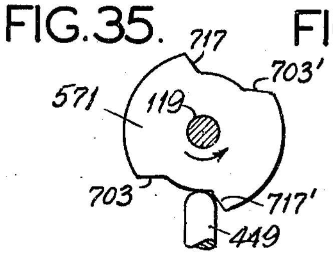
Figs. 35 to 38 are diagrammatic detail sections taken on lines 35—35 to 38—38 respectively of Fig. 21, showing additional operating cams.
Figure 36:
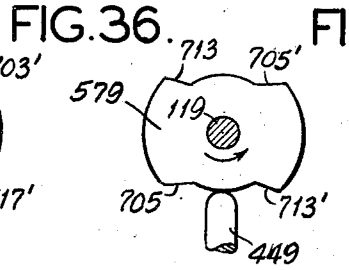
Figure 37:
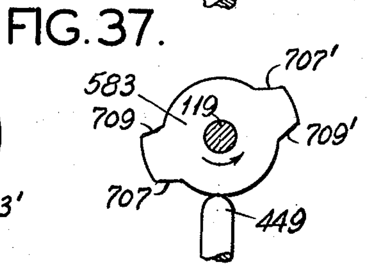
Figure 38:
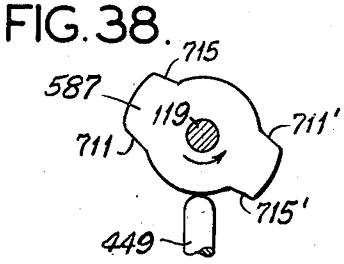

Next, cam 513 (Fig. 32), by means of a rise 659, opens its valve to evacuate line 515 and bellows 193 on the side of rocker 191 which will draw the rocker 191 to the right in Fig. 3. This, through link 185 and gear train 181, 177, causes inverting of the cradle 123 and a turn-over of the turntable 143. The record on the turntable 143 is still suction-held against gravity. At about this time, the other side 201 of the rocker 191 in the bellows 193 is vented over line 511 through operation of the drop portion 661 of cam 509 (Fig. 31), which causes its valve to move to venting position. At this time the bellows 387 must also be vented and this is accomplished by drop portion 669 on cam 495 (Fig. 29).

*Step VII*

Next, cam 501 (Fig. 34), by means of a rise 663, opens its valve to evacuate line 503 which evacuates bellows 375. This, through the link 367, rotates the push bar 359. Bar 359, through the pad 383, again drives the tone arm 309 horizontally toward the record. Toward the end of the travel the contact wheel 385 touches the edge of the record, as shown in Figs. 7 and 11, which corresponds to a proper position of the needle at the outer perimeter of the playing groove.

*Step VIII*

Next, the cam 465 (Fig. 24), by means of a drop portion 621, recloses its valve and vents the line 467 which vents the bellows 327, which through the lost-motion linkage 341, 343 (Fig. 9) allows the tone arm to lower by gravity to playing position. It will be understood that the lost-motion connection at 341, 343 allows overtravel of the bellows rocker 329 when the weight of the tone arm comes against the record. At this time the record playing groove takes control of the needle and feeds it with the playing arm across the record. It will be noted that only the weight of the tone arm supplies the playing pressure on either side of the record which is conducive to consistent sound reproduction. It will also be noted that the lost-motion connection at 395 (Fig. 4) will have allowed complete swinging movement of the tone arm to, and across, the record. Thereafter the bellows 387 is ready to return the tone arm to the initial position of the latter, the lost motion having been taken up.

*Step IX*

While the tone arm traverses the record, cam 501 (Fig. 34), by means of a drop 665, again closes its valve and vents line 503, thus venting bellows 375, which expands by means of an internal spring 667. This bellows through link 367 swings the post 361 to return the push bar 359 to its starting position, as shown in Fig. 12. This occurs while the tone arm is traversing the record.

*Step X*

Cam 461 (Fig. 23), by means of a drop portion 625, shuts its valve and allows the line 463 to vent the bellows 429, thus reopening the clutch 116 which stops the cam shaft 113 during the time that the tone arm is traversing the record.

The purpose of halting the cam shaft 113 during the playing period of the tone arm on the record is automatically to adjust the total cam shaft action to any differences in time required for the playing of records of different sizes. It is to be emphasized that this cam shaft halt occurs during playing of either side of any record. Hence from the above, it will be clear that regardless of the time taken for playing a record, the phasing of the operations by the cam shaft 113, before and after playing, is always correct. This is true even if the operator decides manually to lift the tone arm 309 and set it back in the record groove in order to repeat a sound phrase of any length. Under such circumstances all automatic action is simply held in abeyance until the tone arm in its playing reaches the end of the record groove. This is true, regardless of what side of the record is being played.

The tone arm, in the process of playing the second or what might be called the second side of the record, will finally reach a position in which it again contacts the stem 609 of the sequence valve 597. This again evacuates the line 617 which again evacuates bellows 429 and re-engages clutch 116, which again starts the cam shaft.

As soon as atmospheric pressure enters the clutch bellows 429, it also enters the bellows 543 through lines 467 and 619, thus pulling back the interlock bar 545 so that if desired the operator may now pull out the repeat button 531 for repeating purposes to be described below.

*Step XI*

After the cam shaft 113 restarts, cam 461 (Fig. 23), by means of the rise 627, reopens its valve to evacuate the line 463 to maintain closure of the clutch 116 when the sequence valve again shuts, as it will when the tone arm returns to starting position.

It will be observed that whenever the bellows 429 which controls the clutch 116 is evacuated through lines 617 and 619, the bellows 543 is evacuated to hold shut the interlock bar 545. Thus whenever the clutch 116 is closed, the interlock bar 545 prevents the operator from pulling out the button 531. On the other hand, whenever the vacuum is released in the bellows 429, it will be released in bellows 543, thus clearing the interlock bar 545. The bar 545 clears only during traverse of the record by the needle of the tone arm and the repeater valve 471 may be operated and then only.

*Step XII*

Next, cam 465 (Fig. 24), by means of a rise 629, causes its valve to connect the line 467 to evacuate it and thus evacuate bellows 327, which again lifts the tone arm. This occurs at the end of the playing of the record.

*Step XIII*

The cam 495 (Fig. 29), through a rise 631, again opens its valve to evacuate line 497 connecting with the bellows 387 which, as above described, causes the tone arm to be returned through action of the connecting rod 397 on the post 313.

*Step XIV*

Now cam 473 (Fig. 25), through its drop 671 causes its valve to vent the line 475 and the turntable grip 145, which releases the record from the now inverted turntable 143. The record drops down onto a soft record holder 635, within the record receiver drawer 637 (Figs. 2, 3, 5 and 48).

*Step XV*

Now cams 509 (Fig. 31) and 513 (Fig. 32) become inversely operative at about the same time (cam 509 by means of a rise 673, and cam 513 by means of a drop 675), respectively to evacuate the line 511 and vent the line 515. This moves the rocker 191 back to the position shown in Fig. 3, wherein the cradle is turned from its inverted to its upright position. This causes the turntable 143 again to become upright, ready for receiving the next record. It should be observed in the case of Figs. 49 and 50 that the diagrammatic bellows 193, 201 is viewed from the opposite side from the view of Fig. 3. Thus at this stage in Fig. 49 the rocker 191 will move to the right in order to attain the Fig. 3 position.

*Step XVI*

Cam 485 (Fig. 28), by means of a rise 677, then causes evacuation of line 487 which evacuates bellows 265, which through the rod 257 lifts the arm 251, thus lifting the record grip 235 along with the next record 240 held thereon by suction. It will be noted that this record is the topmost record on the stack 241. As the topmost record is lifted off, the rod 559 which was held down springs up through the record holes positioned along the center of the stack.

*Step XVII*

Cam 481 (Fig. 27), by means of a rise 679, evacuates line 483 and bellows 283. When this bellows collapses, it overcomes the action of bellows 291 even though the latter is under vacuum, because of the excess area of bellows 283. Thus the rocker 281 is caused to draw over the rod 277 and swing post 227 along with arm 229 from the position shown in Fig. 3 to the position shown in Fig. 15, thus removing a record 240 from the stack 241 and holding it in place over the turntable 143 preparatory to lowering the record onto the table.

*Step XVIII*

Cam 485 (Fig. 28), by means of a drop 681, vents line 487 which vents the bellows 265, thus permitting the arm 251 to descend along with the record grip 235. Thus the record is placed upon the turntable, the short post 153 on the latter entering the record hole to assure centering.

*Step XIX*

It is now necessary to break the vacuum in the record grip 235 and establish one in the turntable grip 145. For this purpose the cam 477 (Fig. 26), by means of a drop 683, vents line 479, thus breaking the vacuum in the grip 235 to release the record onto the turntable.

*Step XX*

Cam 473 (Fig. 25), by means of a rise 685, causes evacuation of line 475 and in the turntable grip 145 which grips the record on the turntable.

*Step XXI*

Cam 485 (Fig. 28), by means of a rise 687, now evacuates line 487 and bellows 265, thus again lifting the rod 257 and arm 251. This lifts the record grip 235 which at this time is without the deposited record.

*Step XXII*

The arm 251 is returned by swinging back the arm 229. Cam 481 (Fig. 27), by means of a drop 689, accomplishes this by venting line 483, thus venting the bellows 283 which allows for swing of the rocker 281 under the action of the vacuum still in the small bellows 291.

*Step XXIII*

At this time cam 485 (Fig. 28), by means of a drop 691, vents line 487 and bellows 265 which again permits descent of the arm 251 so that the record grip 235 contacts the next record on the stack, at the same time depressing the alignment pin 559.

*Step XXIV*

Cam 477 (Fig. 26), by means of a rise 693, then again causes evacuation of line 479 and reestablishment of the vacuum in the record grip 235, thus gripping the next record on the stack 241 ready for then ext cycle.

*Step XXV*

Cam 495 (Fig. 29), by means of a drop 695, vents line 497 and bellows 387, which is thus prepared for being compressed without resistance when motion is required of it from link 397. Before this, the tone arm 309 was being against pusher bar 359 by the vacuum which existed in this bellows 387.

*Step XXVI*

Cam 489 (Fig. 30), by means of a rise 697, evacuates the line 491 and bellows 375, which collapses, and, through link 367, rotates the push bar 359 to position the tone arm 309 toward playing position as indicated in Fig. 11. Finally the roller 385 again touches the edge of the record.

*Step XXVII*

Drop 639 on cam 465 (Fig. 24) vents the line 467 which in turn vents the bellows 327 to allow the tone arm 309 to descend onto the record.

*Step XXVIII*

Cam 489 (Fig. 30), by means of a drop 699, vents line 491 and bellows 375, which allows return of the push bar 359. The tone arm is free to be fed across the record by the action of the record groove.

*Step XXIX*

Cam 461 (Fig. 23), by means of a drop 701, vents the line 463 and the bellows 429 controlling the clutch 116, which stops the motion of the cam shaft 113. It will be observed that this cam 461 also vents the lines 617 and 519 and bellows 543, thus reopening the interlock 545 so that the button 531 may be pulled out at will.

In the above it may be observed that a cam 517 (Fig. 33) has moved through a cycle but has not been mentioned in detail because its functions are only effective for "drop" recording operation, to be mentioned later.

Successive records are played from the stack 241 until it is exhausted. After the last side of the last record has been played and it has been dropped, the turntable 143 is turned to its upright position by means of cam 461 as described under Step II, above. The record grip 237, although having no record to pick up, will pass through its pick-up cycle and arm 229 will swing over as if to place a record on the turntable and then return to the Fig. 3 position, all as described above. It may be noted parenthetically that although the record grip 237 will, in the absence of records 241, tend to adhere to part 14, nevertheless the lifting action of arm 251 is strong enough to break the connection. However, no record will be deposited on the turntable and, as the mechanism continues through its cycle, the push bar 359 will push the tone arm 309 to the position shown in Fig. 13 because the wheel 385 contacts no record edge. This allows an arm 641 extending from the post 361 to contact an electric switch 643, preferably a so-called micro switch (see also Fig. 49) mounted on a bracket 642 on the frame 15, which switch opens the motor circuit. From the above it will be clear that an operator after starting a playing sequence may leave the machine altogether and dismiss it from his mind and be assured that it will properly stop at the end of a playing sequence.

All of the played records appear in a stack in the drawer 637 (Figs. 3 and 48). It is important that this drawer be not withdrawn when the machine is in operation. For this purpose a switch 645 (see also Fig. 49) is placed behind the drawer to be closed when the drawer is shut for receiving records. This switch 645 is in the motor circuit and thus the mechanism cannot be energized until the drawer is in proper closed position.

Also, as soon as the motor circuit is energized (drawer closed) a solenoid interlock 647 is caused to have its plunger 649 raised behind a latch 651, the latter being attached to the drawer 637. Thus the drawer cannot be drawn open as long as the circuit is energized. This assures that no records will be dropped elsewhere than into the drawer.

The practice of dropping one record flat on another is a very satisfactory way of depositing records. This is because the vacuum release of the records from grip 235 is instantaneous over the entire gripped area. The records therefore drop in a substantially horizontal position, trapping some air as a buffer. Under such conditions a record may be dropped from a substantial height onto a horizontal surface below it (such as a previously deposited record) without any damage whatsoever, because of the air cushion that occurs under the bottom surface of the descending record. The above holds true under any ordinary substantially level conditions of the machine.

Next, it will be assumed that it is desired to play records made in the so-called "drop" recording sequence, in which the sound sequence on the records is made successively on certain sides of all records and then successively on the opposite sides of all of said records. For this purpose the operator stacks the records with the first-to-be-played sides of each record up, with the first record to be played on the top of the stack and successive records therebelow so that the last record desired to be played is on the bottom. It necessarily follows that the last-to-be-played sides of the records to be played, face downwardly, and the ordered sequence of these sides is from the bottom up. This stack, minus the top record, is placed on the table 13, and the removed record is placed on the turntable 143. Then the control button 553 of the "drop" recording valve 507 (Fig. 43) is pushed into the position shown in Fig. 43 which blocks line 503 and opens line 519. The moved position of valve 507 is not shown in Fig. 49 but, in view of Fig. 43, the effect of moving it is obvious. This in effect cuts out all effective action of the cam 501 because line 503 (which it controls) is dead. At the same time line 519, which formerly was cut off, is operable, which makes effective the action of cam 517 above mentioned as having been ineffective during the "manual" recording cycle.

Next the machine is turned on as before at the main switch 567 and the playing cycle for the top of the first record is as described under Steps I–VI above. The problem then is to turn this record over and drop it without playing its opposite side, because it is desired next to play the top side of the next successive record and so on through the stack.

Since line 503 is blocked and the effective action of cam 501 is cancelled, Step VII of the above mentioned sequence is eliminated, which takes the operation directly from Step VI to Step VIII. It will be observed that Step VII was responsible for swinging the tone arm toward and into contact with the record for playing the bottom side of a record, which in this "drop" sequence is not desired. With Step VII eliminated and the turntable inverted, but before the record is dropped, Steps VIII and IX occur in regular sequence but the tone arm is not pushed in because of the absence of the action of cam 501. In effect the playing time for the underside of this first record is zero in the absence of Step VII.

Then when Step X is approached, said cam 517 (Fig. 33), becomes effective because its line 519 has been opened by the operation of "drop" recording valve 507. Thus, assuming that Step IX has been completed, which normally would bring into action Step X, Step X cannot occur under action of formerly described cam 461 because cam 517 overrides its activities at the drop 625 and rise 627 of cam 461. This is because cam 517 has no drop and rise at this phase but holds its valve V in a non-venting position, that is, a position in which the line 519 is connected and carries a vacuum to the bellows 429 for operating the clutch 116. This allows the cam shaft 113 to continue to rotate although Step X has been cut out.

Thus Step XI is instigated after elapse of a short interval of time required for the cam 461 to rotate an angular distance between the drop 625 and the rise 627. Step XI, it will be recalled, is the one that formerly instigated the playing of the top side of the second record, which is the desired operation in the present "drop" cycle sequence. Thus each complete cycle for each record involves the same Steps I–XXIX as above mentioned, with the exception of Steps VII and X.

Another desirable feature in a record changer is the ability to repeat at will on a given side of any record. The present machine also accomplishes this by introduction of the second cam shaft 119 with the additional clutch 122 (Figs. 21, 35–38 and 50). In this case the "drop" sequence valve 507 may be left in either its original position of Fig. 49 or 50 to play either a "drop" recording or a "manual" recording sequence. The only adjustment needed for repeating operation is to pull up on the repeat button 531, which resets the repeat valve 471 from the position shown in Figs. 41 and 49 to the position shown in Figs. 42 and 50. It will be recalled how the interlock 545 allows such operation only during the periods when a record is being played (clutch 116 disengaged) and excludes the repeating operations during record changing functions. As will appear, the second interlock 541 prevents this button 531 from being pushed in again while the clutch 116 is engaged.

Figs. 35–38 and 50 will make the operation clear. Assume that a record is playing according to Step VIII or XXVII, mentioned above. The operator pulls out button 531. The reconnections shown in Fig. 50 occur. Among the changes are that the lines 603, 617 of the sequence valve 597 now connect through ports 527 and 528 via line 575 with the bellows 430 for operating the clutch 122 of the cam shaft 119 whenever the sequence valve 597 opens. This also makes it possible through line 577 to evacuate bellows 539 of the interlock 541 which then becomes operative. Another vacuum connection established is through line 573 with the valve of cam 571.

The shift in the repeater valve 471 vents line 467. It also connects line 581 through ports 469 and 470, thus supplying the valve of cam 579. Another change is the venting of a part of line 497 and establishment of a connection between line 585 and the remainder of line 497 (see ports 499 and 500). This establishes a direct connection between the valve of cam 583 and bellows 387.

Another change is to vent a part of line 491 and to establish a connection between line 589 and the remainder of line 491 (see ports 493 and 524). This establishes a direct connection between the valve of cam 587 and the bellows 375.

The above changes in effect substitute the operation of cams 571, 579, 583 and 587 (on cam shaft 119) for cams 461, 465, 495 and 489, respectively (on cam shaft 113). These cams 571, 579, 583, 587 are shown in Figs. 35–38. During the repeat cycle, only these cams 571, 579, 583, 587 are moving, clutch 122 being responsible for their operation. The formerly operating clutch 116 is inoperative and in open position, its control bellows 429 being vented. The reconnection of line 617 through ports 527 and 528 cuts off the part of line 617 extending to the bellows 429 of clutch 116 and serves to energize by evacuation line 575 to bellows 430 of the clutch 122. It will be remembered that the repeat valve 471 cannot be pulled out, by reason of the interlock 545, except when a record is playing. Thus the cam shaft 113 will stand in one of two positions corresponding to playing a top or a bottom side of a record. One position is that corresponding to Step VIII, and the other that corresponding to Step XXVII. Thus as soon as the repeat valve 471 is pulled out, the action of clutch 122 is substituted for action of clutch 116.

The operation of repeating the playing of a record is as follows:

*Step XXX*

This step corresponds to Step II mentioned above, except that, in view of the change at ports 526, 527, 528 at the end of the playing of the record sequence, valve 597 instigates operation of clutch 122 (through operation of bellows 430) instead of clutch 116 (through operation of bellows 429).

*Step XXXI*

As cam shaft 119 starts to rotate, cam 571 (Fig. 35), through a rise 703, maintains a vacuum in line 575 through the connection 573 in the same manner that cam 461 maintained it when the cam shaft 113 was rotating.

*Step XXXII*

Rise 705 on cam 579 (Fig. 36) causes evacuation of line 581 and thus also part of line 467 (see ports 469 and 470). This applies vacuum to the bellows 327, which is responsible for lifting the tone arm, as in Step IV above.

*Step XXXIII*

Rise 707 on cam 583 (Fig. 37) also evacuates line 585, which evacuates part of line 497 (see ports 499 and 500), thus evacuating bellows 387. This causes return of the tone arm toward starting position (see Step V above).

*Step XXXIV*

A drop 709 on cam 583 (Fig. 37) vents line 585 and part of 497, thus venting the bellows 387 which returns the tone arm 309 to its starting position. Actual return is effected by the rise portion 711 on cam 587 (Fig. 38), which causes evacuation of line 589 and part of line 491 (see ports 493 and 524). The evacuated part of line 491 evacuates bellows 375, which, by means of the push bar 359, drives the tone arm horizontally in toward the record (see Step VII).

*Step XXXV*

A drop 713 on cam 579 (Fig. 36) vents line 581 and part of 467 through connected ports 470 and 469. This vents the bellows 327, thus permitting the tone arm to descend so that the needle enters the record track.

*Step XXXVI*

A drop 715 on cam 587 (Fig. 38) vents line 589 and part of line 491 (see ports 493 and 524), which vents the bellows 375. This returns the push bar 359. It will be remembered that the tone arm now is free of the push bar and is being advanced by the record track as in Step IX or Step XXVIII.

*Step XXXVII*

Finally, drop 717 on cam 571 (Fig. 35) vents lines 573, 575 and 577. This vents the bellows 430 of clutch 122, which reopens this clutch and stops the cam shaft 119. It also vents the bellows 539, which withdraws the interlock 541, so that, if the operator desires, he may push in the repeat button 531 and end the repetition. If the operator does not push in the button 531, the mechanism will go on repeating (through operation of the automatic sequence valve 597 by the tone arm 309) and will continue to repeat Steps XXX–XXXVII.

It will be noted in Figs. 35–38 that only 180° of cam shaft rotation have been necessary for the above mentioned actions in Steps XXX–XXXVII. The various primed numerals on these cams correspond to the similar unprimed numerals indicating rises and drops distributed throughout the remaining 180° for repeating the action. This allows one revolution of the cam shaft 119 to effect two repeat actions, which is to say that the time required for repeat sequences (exclusive of the record playing itself) is reduced by one-half, assuming the same speed reduction in gear train 441, 439 as is used in gear train 409, 407. It will be understood that further reduction in time could be effected by changing the speed values of the gear train 441, 439.

It may be noted that, when the repeat cycle button 531 is returned, the machine will continue to play the record sequence where it left off when the repeat cycle button was pushed in. It should be understood however that any repeat cycle once started will go on to the end of the playing of a given side of a record.

If the operator desires not to wait out the playing of a given side of a record until the sequence valve 597 is operated by the tone arm 309, he may press the button 615 for reject valve 613 (Figs. 39, 49 and 50). Valve 613 by-passes the sequence valve 597 and has the effect of immediately starting over a repeat operation. The operator can also stop the playing of any record at any point by operating the reject valve 613 and, by pushing in the button 531, instigate the original sequence of operation.

Thus the operator may reject the playing to completion of a given side of any record by pushing the reject valve 613. If the machine is in adjustment for "manual" recording, and the first side of a record is being played, the tone arm will be returned and, since the repeat button 531 is pushed in, the record will proceed to turn over for continuation of the sequence of play. If under these conditions the machine is set for playing "drop" recordings, then the sequence is picked up so that the record is turned over and dropped. When the machine is set for "manual" recording and a bottom side of a record is being played, then operation of the reject valve 613 will prevent completion of the playing of that side, return the tone arm to starting position and drop the record. In addition, the next record will come on in sequence. These variations will be clear from a description of the cycle already given.

Figure 52:
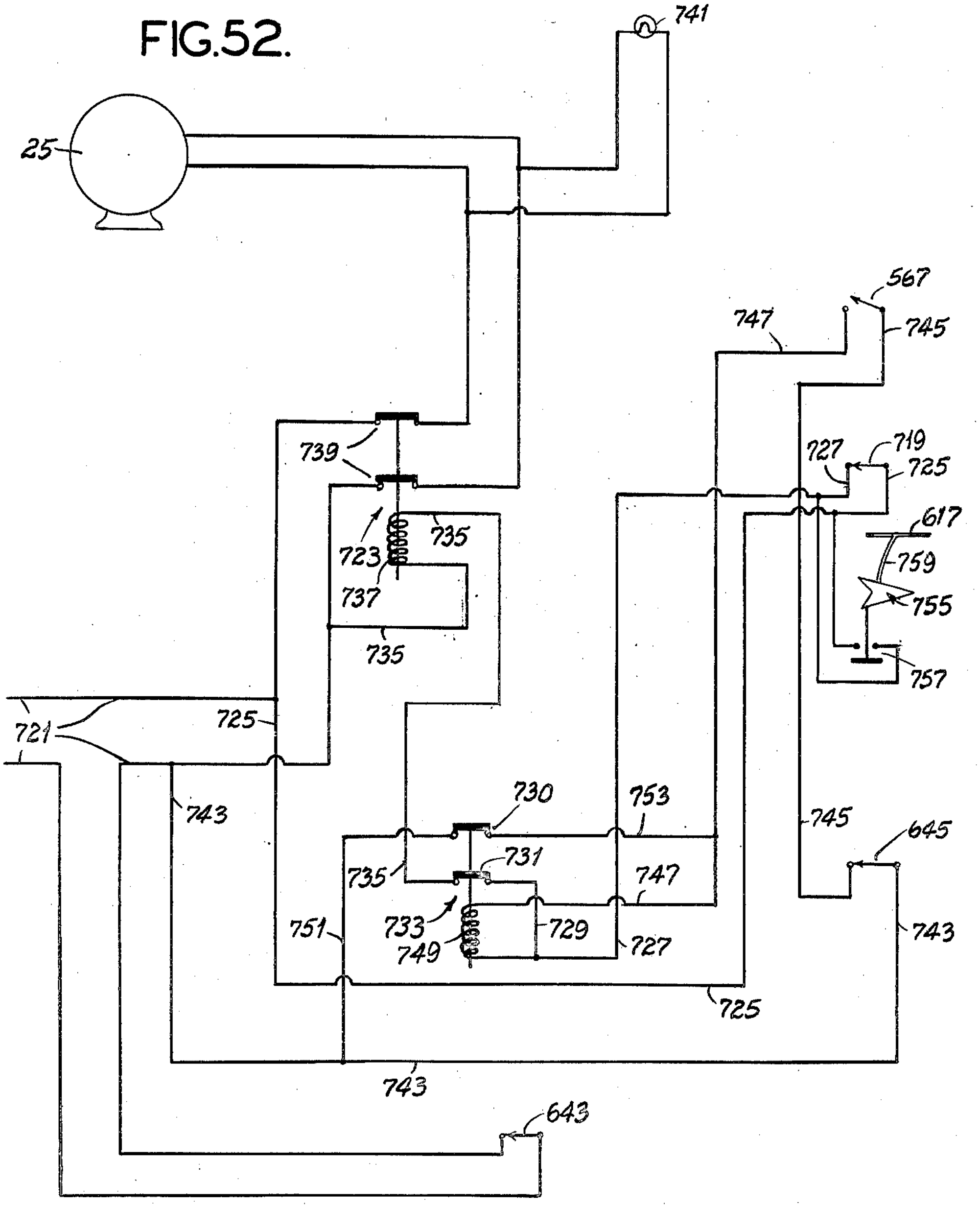
Fig. 52 is a wiring diagram showing an additional safety feature.

Fig. 52 shows an electrical circuit for providing additional features which may be desirable in many embodiments of the invention. By its means a turn-off operation may be effected at any instant during its action, excluding periods when a record is being inverted or transported. It precludes dropping of a record during any inverting or transporting period. For this purpose an additional stop switch 719, which is normally closed, maintains a circuit across the power line 721 and through the coil of a magnetic switch 723. This circuit is indexed 725, switch 719, 727, 729, one set of contacts 731 of magnetic switch 733, line 735 through the coil 737 of magnetic switch 723 and to the other side of the power line 721. Coil 749 of switch 733 is also energized if switches 567 and 645 are closed (not lines 747, 745 and 743). Thus as long as the switch 719 remains closed, magnetic switch 723 will remain closed and hold a circuit through its double set of contacts 739. It may be noted also that as long as the motor circuit is closed, a pilot light 741 will burn.

When the stop switch 719 is opened, both switches 723 and 733 are opened. The starting switch 567 which is normally open serves when closed to close the switches 723 and 733. Thus when switch 567 is closed, current flows over line 743, drawer switch 645 (if closed), line 745, switch 567, line 747, coil 749 (of switch 733), line 729, contacts 731 of magnetic switch 733, line 735 and coil 737. Switch 567 is of the momentary contact type and as soon as it is closed, a holding circuit is established over lines 745, switch 645, 743, 751, closed contact 730 of magnetic switch 733, lines 753, 747 to coil 749, line 727, then closed switch 719, line 725 to power line 721.

An additional bellows mechanism 755 is provided for operating a switch 757 connected across the stop switch 719. When the bellows 755 collapses under vacuum the switch 757 closes and vice versa. Thus the vacuum line 759 of the bellows 755 proceeds to line 617 which, it will be recalled, evacuated bellows 429 and 430 which respectively controlled the clutches 116, 122, depending upon the position of the repeat valve 471. Thus, it will be seen that operation of the switch 757 overrides the action of the stop switch 719 to maintain the apparatus running, should the stop switch be opened, so long as either of said clutches 116 and 122 is closed. Since the closure of the said clutches is responsible for the operation of the cam shafts 113, 119, and the cam shaft operations are responsible for various operations in connection with the records, it will be seen that it would be impossible for the machine to shut off from switch 719 while the records are being transported or inverted, although switch 719 may at any time be operated during playing of a record to instigate the shut-off event which will occur immediately.

On the other hand, whenever the vacuum is released in bellows 429 and 430 (by release in line 617), it will also be released in line 759 and in the said additional bellows 755. This reopens the switch 757. Hence if and when switch 719 is reopened, the magnetic switches 733 and 723 may reopen to stop the action. Thus, if the stop switch 719 is opened while music is being played, the music is stopped because no record is being inverted or transported while this switch 719 is open. At any other time the machine will continue to operate until inverting or transporting operations on the records are ended, after which the machine may be stopped.

In Fig. 52 the tone arm switch 643 is shown as being in series with the main line 721 and its effect is at the proper time in the cyclic operation, as has been made clear, to stop the machine. This cannot occur at any time during which records are being inverted or transported. Briefly, the machine can only stop at the zero positions of the cam shafts 113, 119, which are the positions assumed by them when the clutches 116 and 122 are open.

Although the specific embodiment of the invention refers to hinged bellows mechanisms for maintaining a partial vacuum or suction, it will be clear that other suction units may be substituted, such as, for example, evacuated cylinders with pistons, flexible diaphragms, metallic bellows and the like, or even centrifugal vacuum means.

The vacuum-operated mechanism has ideal operating characteristics for the purposes in hand. This is because by valve action a vacuum may be increased and decreased in a manner to produce the most favorable motion changes in the shortest time without jarring of the records and playing parts. It will be clear, however, that many of the features of the invention may be carried out by electrical equivalents.

A most important broad feature of the invention is the use of the invertible turntable, including means for attracting a record thereto, said turntable being of a diameter less than the inside diameter of the sound track; whereby upon inversion of the turntable and "hanging" of the attracted record, the underside of the record is exposed upward for application of the tone arm, and whereby the played record may subsequently be simply released for detaching it from the turntable. This construction makes it mechanically feasible and convenient to feed records successively from a stack to the turntable when upright, and to have these conveniently successively removed from the inverted turntable after playing.

Another important feature of the construction is that the timing of the playing of successive records may conveniently be switched from a playing of successive opposite sides of a series ("manual" recording) or playing of successive corresponding sides of a series ("drop" recording). In this connection it will be noted also that regardless of whether "manual" or "drop" recordings are being played, the gravity-pressed tone arm applies exactly the same pressure and riding characteristics of the needle in the record groove, regardless of which side of a record is being played. For example, in certain former machines a gravity pressure was used on one side of a record and a spring pressure on the other side, which resulted in different playing characteristics.

Another advantage is the combination with the above of repeater means. The various safety characteristics and means for maintaining maximum simplicity of operation for the user need not be reiterated here, being clear from the above description.

It will be seen that the invention is fool-proof. For example, after a first record has been applied to the turntable, the tone arm need not have its needle applied to the first part of the record groove for starting, but starting may be initiated in the middle of the groove. Also, the tone arm may be manually picked up at any time while playing any side of any record and returned manually for repeating a sound phase (as on an ordinary phonograph) without in the least disturbing any of the sequence activities of the automatic parts of the machine. This is because the automatic sequence operation is free of any connection with the swinging action of the tone arm during playing, all sequential operation being held in abeyance while the tone arm is playing.

In view of the above, it will be seen that the several objects of the invention are achieved and other advantages results attained.

As many changes could be made in the above constructions without departing from the scope of the invention, it is intended that all matter contained in the above description or shown in the accompanying drawings shall be interpreted as illustrative and not in a limiting sense.

We claim:

1. In a record changer, an invertible turntable, means adjacent said turntable for holding a supply of records, transfer means adapted to transfer a record from said supply to said turntable, means for rotating said turntable, vacuum means associated with the turntable for attracting the record to the turntable with a force greater than the weight of the record, means for inverting the turntable with the vacuum-attracted record, and means for subsequently breaking the vacuum while the turntable is inverted in order to release the record.

2. In a record changer, a turntable, means for successively transferring records from a supply to said turntable, means for rotating said turntable, vacuum means embodied in the turntable for attracting to the turntable each successively applied record with a force greater than its individual weight, means for moving a tone arm into playing position with respect to the record on the turntable while rotating to play the record and subsequently to remove the tone arm therefrom, means for inverting the turntable with the attracted record while maintaining the vacuum, and means for subsequently breaking the vacuum while the turntable is inverted in order to release the record.

3. In a record changer, a rotary turntable, means for successively transferring records from a supply to said turntable, vacuum-operated suction means embodied in the turntable for holding to the turntable each record applied thereon, automatically operative tone arm means movable into position to play the upper side of the record after application to the turntable and thereafter movable to recede and clear therefrom, means for inverting the turntable while holding the record by suction, said automatic tone arm means being adapted thereafter to be applied to the other side of the record to play it and then automatically to recede and clear therefrom, and means for thereafter breaking the vacuum to release the record from the inverted turntable.

4. In a record changer, a rotary turntable, means for successively transferring records from a supply to said turntable, a suction area defined by resilient lip means on the turntable, vacuum means connected with the area defined by the resilient lip means for attracting to the turntable each record applied thereon over the lip means, automatically operative tone arm means movable into position to play the upper side of the record after application to the turntable and thereafter movable to recede therefrom, means for inverting the turntable while maintaining the vacuum to hold the record by suction, said automatic tone arm means being adapted to be applied to the other side of the record to play it and then automatically to recede therefrom, and means for thereafter breaking the vacuum for releasing the record from the inverted turntable, the degree of vacuum maintained before being broken being such that the attraction between the record and the turntable is greater than the weight of a record plus the force applied to the record by the tone arm means.

5. In an automatic record changer, a rotary and invertible turntable, suction means embodied in said turntable for attractively holding a record thereto so as to support and drive the same in a given direction of its upper side when the turntable is upright or inverted, a gravity-operated tone arm pivoted adjacent the turntable for application to the upper side of a record on the turntable, pneumatic means for holding said tone arm at an elevation higher than that of the upper side of the record, pneumatic means for moving the tone arm laterally toward the record and thereafter gravitationally applying it to the groove of the record, means responsive to a complete swing of the tone arm in playing the record to raise the tone arm and swing it laterally therefrom, means for inverting the turntable with the record, selective means for thereafter either dropping the record or repeating the playing action of the tone arm on the other side of the record, and means in the latter contingency for dropping the record after the tone arm has played it the second time and receded therefrom.

6. In a record changer, a rotary and invertible turntable, attracting means embodied in said turntable for holding a record thereto so as to support the same when the rotary turntable is upright or inverted, a tone arm, means adjacent said turntable movably supporting said tone arm for application to the upper playing side of a record on the turntable, means for initially holding said tone arm up above the playing surface of the record, means for automatically first moving the tone arm laterally toward the record and then dropping and applying the tone arm to the playing surface, means responsive to final playing movement of the tone arm to raise it and retract it from the record, means for thereafter automatically inverting the turntable to invert the record, selective means for thereafter either releasing the record or repeating said automatic playing action of the tone arm on the inverted upper playing surface of the record, and means which in the latter contingency releases the record after it has been played the second time by the tone arm.

7. In a record changer, a rotary and invertible turntable of a diameter not greater than the hub of the record, vacuum means embodied in the turntable for attractively holding to the turntable a record deposited thereon, a vacuum-operated tone arm mounted for swinging movement from a retracted position to record playing position to play the top side of the record when the turntable is upright, vacuum-operated means for retracting the tone arm from the top of the record after the latter has been played, vacuum means for inverting the turntable and the record after the tone arm has been retracted, means responsive to inversion of the turntable for causing the tone arm again to play the record after it has been inverted, said vacuum means controlling the tone arm allowing the tone arm to rest against the record by gravity only during playing, regardless of which side of the record is being played.

8. In a record changer, a rotary and invertible turntable of a diameter not greater than the hub of the record, suction means embodied in the turntable for attractively holding to the turntable a record deposited thereon, a tone arm mounted for swinging movement from a retracted position to record playing position to play the top side of the record when the turntable is upright, means for retracting the tone arm from the top of the record after the latter has been played, automatic means for inverting the turntable and the record after the tone arm has been retracted, automatic means for causing the tone arm to play the bottom of the record after it has been inverted, said tone arm being pivotally mounted and held against the record by gravity only, regardless of which side of the record is being played, said suction means being adapted to hold the inverted record to the turntable despite the gravity force of the record and the tone arm, and means for releasing the suction to drop the record from the turntable after the tone arm has been retracted subsequently to playing the bottom of the record.

9. In a record changer, a rotary record-supporting turntable, said turntable extending radially not further than the blank hub portion of a record, a cradle for said turntable, means pivoting the cradle for inverting the turntable, the center line of the pivoting means being substantially in the central plane of a record supported upon the turntable, drive means carried by the cradle for turning the turntable, a rotary friction member for said drive means carried by and extending from one end of the cradle beyond the edge of a supported record, said friction member being rotary on an axis offset from the plane of a supported record, a drive shaft extending transversely to the center line of the pivoting means and offset from the edge of a supported record, and a pair of friction members rotary with said drive shaft and spaced on opposite sides of said center line, the friction member carried by the cradle being movable, upon inversion of the cradle and turntable, from a position engaging one friction member on the drive shaft to a position of engagement with the other friction member of said drive shaft, whereby inversion of the turntable will cause a reversal of rotation thereof with respect to said cradle but will bring about a like rotation thereof when viewed from one side of the record.

10. In a record changer, a rotary record-supporting turntable, said turntable extending radially not further than the blank hub portion of a record, a beam-like support for said turntable which support clears the edge of the record, means pivoting the beam for inverting the turntable, the center line of said pivoting means being substantially in the central plane of a record supported upon the turntable, drive means on said support for turning the turntable including a friction cone extending from one end of the support beyond the edge of a supported record, said cone being rotary on an axis offset from the plane of a supported record, a drive shaft extending transversely to the center line of the pivoting means and offset from the edge of a supported record, and a pair of friction cones rotary with said drive shaft and spaced on opposite sides of said center line, the friction cone extending from said support being movable, upon inversion of the support and turntable, from a position engaging one friction cone on the drive shaft to a position of engagement with the other friction cone of said drive shaft, whereby inversion of the turntable will cause a reversal of rotation thereof with respect to said support but a like rotation thereof when viewed from one side of the record.

11. In a record changer, a rotary turntable of a diameter less than the inside diameter of the playing grooves on records, suction means embodied in said turntable for attracting a record thereto with a force exceeding that of gravity on the record, said turntable being carried by an invertible cradle beam pivoted substantially in the plane of a record carried by the turntable and beyond its outer edge, drive means on the beam for rotating the turntable, and mechanical means for actuating said drive means and for automatically reversing the rotation of a record on the turntable with respect to the cradle beam when the latter is inverted.

12. In a record changer, a rotary turntable of a diameter less than the inside diameter of the playing grooves on records, vacuum means associated with said turntable for attracting a record thereto with a force exceeding that of gravity on the record, said turntable being carried by an invertible cradle beam pivoted substantially in the plane of a record on the turntable and beyond its outer edge, means carried by the beam for supplying vacuum to the table, drive means carried in part by the beam for driving the turntable, and a mechanical connection in the drive means for automatically reversing the direction of rotation of a record on the turntable with respect to the cradle beam when the latter is inverted.

13. In a record changer, a rotary turntable of a diameter less than the inside diameter of the playing grooves on records, means embodied in said turntable for attracting a record thereto with a force exceeding that of gravity on the record and any parts pressed against it, said turntable being carried by an invertible cradle beam pivoted substantially in the plane of a record carried by the turntable and beyond its outer edge, means for automatically reversing the rotation of the turntable and record with respect to the cradle beam when the latter is inverted, a tone arm mounted to swing substantially parallel to and above the record and to be vertically movable from a position with its needle above the record groove to a position with the needle in the groove, a push bar for the tone arm mounted for movement parallel to the plane of the record from a retracted position to a position engaging its edge, said push bar being adapted to move said tone arm when elevated to a position with its needle near the edge of the record, means for subsequently lowering the tone arm to position its needle in the groove of the record whereupon the tone arm is fed across the record by action of the groove, means for returning the push bar to its initial retracted position, means responsive to movement of the tone arm to its final position in said groove for raising the tone arm and returning it to its initial position clear of the record, means for automatically inverting said cradle beam with the turntable and attached record after said return of the tone arm, means for automatically repeating the stated operations of the tone arm and the push bar with respect to the then turned upper side of the record, means for thereafter releasing the record from the inverted turntable, means for re-inverting and reversing said rotation of the turntable to set the turntable upright for receiving another record, record transfer means mounted for swinging movement between and over a record stack and the turntable including record attracting means, means for applying said last attracting means to an uppermost record on the stack, lifting said record, swinging it over the turntable and depositing it thereon, removable catch means below the turntable for receiving released records, a circuit for energizing the record changer, and switch means in said circuit adapted to be closed when the catch means is in position for receiving records but to be opened when said catch means is removed.

14. In a record changer, a rotary turntable, means embodied in said turntable for attracting a record thereto with a force exceeding that of gravity on the record, means for playing a record on the turntable, inverting means for the turntable operative after the record has been played, means for releasing the attraction on the record after the turntable has been inverted, removable catch means below the turntable for receiving released records, a circuit for energizing the record changer for the functions stated, and switch means in said circuit adapted to be closed when the catch means is in record-receiving position but adapted to be opened when said catch means is removed.

15. In a record changer, a rotary turntable, means embodied in said turntable for attracting a record thereto with a force exceeding that of gravity on the record, means for playing a record on the turntable, inverting means for the turntable operative after the record has been played, means for releasing the attraction on the record after the turntable has been inverted, removable catch means below the turntable for receiving released records, a circuit for energizing the record changer for performing the functions stated, switch means in said circuit adapted to be closed when the catch means is in record-receiving position but adapted to be opened when said catch means is removed, means for preventing removal of said catch means except when said switch is open, and a manually controllable main switch for said circuit.

16. In a record changer, a rotary turntable, means embodied in said turntable for attracting a record thereto with a force exceeding that of gravity on the record, means for playing a record on the turntable, inverting means for the turntable operative after the record has been played, means for releasing the attraction on the record after the turntable has been inverted, means for again turning said turntable upright, means for attracting another record from a supply stack adjacent the turntable and applying it to the upright turntable, removable catch means below the turntable for receiving released records, a circuit for energizing the record changer for performing the functions stated, switch means in said circuit adapted to be closed when the catch means is in record-receiving position but adapted to be opened when said catch means is removed, means for preventing removal of said catch means except when said switch is open, and a manually controllable main switch for said circuit.

17. In a record changer, a rotary turntable, vacuum-operated means embodied in said turntable for attracting a record thereto with a force exceeding that of gravity on the record, vacuum-operated tone arm means for playing a record on the turntable, vacuum-operated inverting means for the turntable operative after the record has been played, means for releasing the vacuum attraction on the record after the turntable has been inverted, a manually removable drawer below the turntable for receiving released records, a vacuum pump for said vacuum-operated elements, a motor driving the pump, an electric circuit for the motor, a manually operated main switch in said circuit, automatic switch means in said circuit adapted to be closed by and when the drawer is in record-receiving position but adapted to be opened by and when said drawer is removed, and solenoid-operated latch means connected with the drawer and energized by the circuit for preventing manual removal of said drawer except when said switch is open.

18. In a record changer, a rotary invertible turntable, means for transferring records successively from a supply to the turntable, means embodied in the turntable for holding the records thereon, means for successively inverting the turntable with the records, means operative to release the records from the inverted turntable, a tone arm mounted to swing in a plane substantially parallel to and above the plane of a record on the turntable, said tone arm having a needle, pusher means for the tone arm movable from a retracted position to a limiting position determined by the edge of a record to position the needle of the tone arm at the outer edge of its record groove, means for returning said pusher means to retracted position, means for lowering the tone arm to position the needle in the groove to play the record and allow the groove to feed the tone arm across the record, sequence means for controlling successive applications of records to the turntable, inversion of the turntable, movements of the tone arm and pusher means, and the releasing of records from the inverted turntable, and control means for initiating action of said sequence means, said control means being operated by the tone arm when the latter is in an ultimate position of the same.

19. In a record changer, a rotary invertible turntable, means for transferring records successively from a supply to the turntable, means embodied in the turntable for holding the records thereon, means for successively inverting the turntable with the records, means operative to release the records from the inverted turntable at a later stage, a tone arm mounted for movement into and out of record playing position for playing the top of a record on the turntable either when the turntable is upright or inverted, a plurality of selective manually controlled alternatively operable sequence means either of which is adapted for controlling successive applications of records to the turntable, movement of the tone arm to play the top of a record when the turntable is upright, and inversion of the turntable; one of said sequence means being adapted thereafter to cause application of the tone arm to the top of the inverted record and thereafter to cause release of the record after it has been played; the other sequence means being alternatively operable to cause release of the record without application of the tone arm to the top of the inverted record.

20. In a record changer, a rotary invertible turntable, means for transferring records successively from a supply to the turntable, means embodied in the turntable for holding the records thereon, means for successively inverting the turntable with the records, means operative to release the records from the inverted turntable at a later stage, a tone arm mounted to swing in a plane substantially parallel to and above the plane of a record on the turntable, said tone arm having a needle, pusher means for the tone arm movable from a retracted position to a limiting position determined by the edge of a record to position the needle of the tone arm at the outer edge of its record groove, means for returning said pusher means to retracted position, means for lowering the tone arm to position the needle in the groove to play the record and allow the groove to feed the tone arm across the top of the record either when the turntable is upright or inverted, a plurality of selective manually controlled alternatively operable sequence means either of which is adapted for controlling successive applications of records to the turntable, movement of the tone arm to play the top of a record when the turntable is upright, and inversion of the turntable; one of said sequence means being adapted thereafter to cause application of the tone arm to the top of the inverted record and thereafter to cause release of the record after it has been played; the other sequence means being alternatively operable to cause release of the record without application of the tone arm to the top of the inverted record.

21. In a record changer, a rotary invertible turntable, means for transferring records successively from a supply to the turntable, means embodied in the turntable for holding the records thereon, means for successively inverting the turntable with the records, means operative to release the records from the inverted turntable at a later stage, a tone arm mounted to swing in a plane substantially parallel to and above the plane of a record on the turntable, said tone arm having a needle, pusher means for the tone arm movable from a retracted position to a limiting position determined by the edge of a record to position the needle of the tone arm at the outer edge of its record groove, means for returning said pusher means to retracted position, means for lowering the tone arm to position the needle in the groove to play the record and allow the groove to feed the tone arm across the top of the record either when the turntable is upright or inverted, a plurality of selective manually controlled alternatively operable sequence means either of which is adapted for controlling successive applications of records to the turntable, movement of the tone arm to play the top of a record when the turntable is upright, and inversion of the turntable; one of said sequence means being adapted thereafter to cause application of the tone arm to the top of the inverted record and thereafter to cause release of the record after it has been played; the other sequence means being alternatively operable to cause release of the record without application of the tone arm to the top of the inverted record, and stop means engageable by said pusher means in an ultimate position of the latter in the absence of a record on the turntable, whereby the apparatus is stopped.

22. In a record changer, a rotary invertible turntable, means for transferring records successively from a supply to the turntable, means embodied in the turntable for holding the records thereon, means for successively inverting the turntable with the records, means operative to release the records from the inverted turntable at a later stage, a tone arm mounted so that it is adapted to be moved to play the top of a record on the turntable either when the turntable is upright or inverted, a plurality of selective manually controlled alternatively operable sequence means either of which is adapted for controlling successive applications of records to the turntable, movement of the tone arm to play the top of a record when the turntable is upright, and inversion of the turntable; one of said sequence means being adapted thereafter to cause application of the tone arm to the top of the inverted record and thereafter to cause release of the record after it has been played; the other sequence means being alternatively operable to cause release of the record without application of the tone arm to the top of the inverted record; and manually controllable repeater means operative in connection with either of said sequence means for repeating the playing of either side of any record on the turntable.

23. In a record changer, a rotary invertible turntable, means for transferring records successively from a supply to the turntable, means embodied in the turntable for holding the records thereon, means for successively inverting the turntable with each record, means operative to release each record from the inverted turntable at a later stage, a tone arm mounted to swing in a plane substantially parallel to and above the plane of a record on the turntable, said tone arm having a needle, pusher means for the tone arm movable from a retracted position to a limiting position determined by the edge of a record to position the needle of the tone arm at the outer edge of its record groove, means for returning said pusher means to retracted position, means for lowering the tone arm to position the needle in the groove to play the record and allow the groove to feed the tone arm across the top of the record either when the turntable is upright or inverted, a plurality of manually selective alternatively operable sequence means either of which is adapted for controlling successive applications of records to the turntable, movement of the tone arm to play the top of a record when the turntable is upright, and inversion of the turntable; one of said sequence means being adapted thereafter to cause application of the tone arm to the top of the inverted record and thereafter to cause release of the record after it has been played; the other sequence means being alternatively operable to cause release of the record without application of the tone arm to the top of the inverted record, and manually controllable reject means for initiating operation of the sequence means at any desired time before the tone arm does so at the end of its playing travel, whereby desired portions of playing action of the tone arm may be skipped.

24. In a record changer, a rotary invertible turntable, means for transferring records successively from a supply to the turntable, means embodied in the turntable for holding the records thereon, means for successively inverting the turntable with each record, means operative to release each record from the inverted turntable at a later stage, a tone arm mounted to swing in a plane substantially parallel to and above the plane of a record on the turntable, said tone arm having a needle, pusher means for the tone arm movable from a retracted position to a limiting position determined by the edge of a record to position the needle of the tone arm at the outer edge of its record groove, means for returning said pusher means to retracted position, means for lowering the tone arm to position the needle in the groove to play the record and allow the groove to feed the tone arm across the top of the record either when the turntable is upright or inverted, a plurality of manually selective alternatively operable sequence means either of which is adapted for controlling successive applications of records to the turntable, movement of the tone arm to play the top of a record when the turntable is upright, and inversion of the turntable; one of said sequence means being adapted thereafter to cause application of the tone arm to the top of the inverted record and thereafter to cause release of the record after it has been played; the other sequence means being alternatively operable to cause release of the record without application of the tone arm to the top of the inverted record, manually controllable reject means for initiating operation of the sequence means at any desired time before the tone arm does so at the end of its playing travel, whereby desired portions of playing action of the tone arm may be skipped, and manually selective repeater means operative in connection with either of said sequence means for repeating the playing of either side of any record on the turntable.

25. In a record changer, a rotary invertible turntable, transfer means for successively transferring records from a record supply to said turntable, means embodied in the turntable for attracting records to the turntable with a force greater than the weight of a record, means for inverting the turntable and automatically controlling the direction of its rotation, means for later releasing attraction on the record under conditions of turntable inversion, a tone reproducer mounted for movement across the face of a record on the turntable whether the latter is upright or inverted, a sequence means for controlling successive applications of records by the transfer means to the turntable while upright, playing an upright record by means of said tone reproducer, returning the tone reproducer from the record, inverting the turntable, playing the upper side of the inverted record by means of said tone reproducer, returning the tone reproducer from the record, releasing the record from the inverted turntable, and turning said turntable upright, and control means operated by the tone reproducer after a first record of a series has been played to start operation of said sequence means.

26. In a record changer, a rotary invertible turntable, transfer means for successively transferring records from a record supply to said turntable, means embodied in the turntable for attracting records to the turntable with a force greater than the weight of a record, means for inverting the turntable and automatically controlling the direction of its rotation, means for later releasing attraction on the record under conditions of turntable inversion, a tone reproducer mounted for movement across the face of a record on the turntable whether the latter is upright or inverted, a first manual-recording sequence means for controlling successive applications of records by the transfer means to the turntable while upright, playing an upright record by means of said tone reproducer, returning the tone reproducer from the record, inverting the turntable, playing the upper side of the inverted record by means of said tone reproducer, returning the tone reproducer from the record, releasing the record from the inverted turntable, and turning said turntable upright, a second drop-recording sequence means, manual means for actuating said second sequence means, said second sequence means effecting successive automatic transfer of records from said supply to the turntable when the latter is upright, applying the tone reproducer to the upper surface of a record on the upright turntable, retracting said reproducer from the record, inverting the turntable, releasing the record, and moving the turntable to an upright position; and control means operated by the tone reproducer after a first record has been played to start operation of either of said sequence means.

27. In a record changer, a rotary invertible turntable, transfer means for successively transferring records from a record supply to said turntable, means embodied in the turntable for attracting records to the turntable with a force greater than the weight of each record, means for inverting the turntable and automatically controlling the direction of its rotation, means for releasing attraction on the record when the turntable is inverted, a tone reproducer mounted for movement across the face of a record on the turntable whether upright or inverted, a first manual-recording sequence means for controlling successive applications of records by the transfer means to the turntable while the latter is upright, playing the upright record by means of said tone reproducer, returning the tone reproducer from the record, inverting the turntable, playing the inverted side of the record by means of said tone reproducer, returning the tone reproducer from the record, releasing the record from the inverted turntable, and turning said turntable upright, control means operated by the tone reproducer after a record has been played to start operation of said sequence means, a second drop-recording sequence means, manual means for starting said second sequence means, whereby when said control means is operated by the tone reproducer a sequence of operation is performed comprising successive automatic transfer of records from said supply to the turntable when upright, applying the tone reproducer to the upper surface of a record on the upright turntable, retracting said reproducer from the record, inverting the turntable and attached record, releasing the record, and moving the turntable to an upright position, and a manual repeater control for determining a sequence of operation consisting in repetition of movement of the tone reproducer onto and from the record on a given side and under either a manual recording or a drop recording setting.

28. In a record changer, a rotary invertible turntable, transfer means for successively transferring records from a record supply to said turntable, means embodied in the turntable for attracting records to the turntable with a force greater than the weight of each record, means for inverting the turntable and automatically controlling the direction of its rotation, means for releasing attraction on the record when the turntable is inverted, a tone reproducer mounted for movement across the face of a record on the turntable whether upright or inverted, a first manual-recording sequence means for controlling successive applications of records by the transfer means to the turntable while the latter is upright, playing the upright record by means of said tone reproducer, returning the tone reproducer from the record, inverting the turntable, playing the inverted side of the record by means of said tone reproducer, returning the tone reproducer from the record, releasing the record from the inverted turntable, and turning said turntable upright, control means operated by the tone reproducer after a record has been played to start operation of said sequence means, a second drop-recording sequence means, manual means for starting said second sequence means, whereby when said control means is operated by the tone reproducer a sequence of operation is performed comprising successive automatic transfer of records from said supply to the turntable when upright, applying the tone reproducer to the upper surface of a recording on the upright turntable, retracting said reproducer from the record, inverting the turntable and attached record, releasing the record, and moving the turntable to an upright position, a manual repeater control for determining a sequence of operation consisting in repetition of movement of the tone reproducer onto and from the record on a given side and under either a manual recording or a drop recording setting, and interlock means for the manual repeater means adapted to prevent operation of said repeater means except when a record is being played by the tone reproducer.

29. In a record changer, a rotary invertible turntable, transfer means for successively transferring records from a record supply to said turntable, means embodied in the turntable for attracting records to the turntable with a force greater than the weight of each record, means for inverting the turntable and automatically controlling the direction of its rotation, means for releasing attraction on the record after the turntable is inverted, a tone reproducer mounted for movement across the face of a record on the turntable whether upright or inverted, a first manual-recording sequence means for controlling successive applications of records by the transfer means to the turntable while the latter is upright, playing the upright record by means of said tone reproducer, returning the tone reproducer from the record, inverting the turntable, playing the inverted side of the record by means of said tone reproducer, returning the tone reproducer from the record, releasing the record from the inverted turntable, and turning said turntable upright, control means operated by the tone reproducer after a record has been played to start operation of said sequence means, a second drop-recording sequence means, manual means for actuating said second sequence means, whereby when said control means is operated by the tone reproducer a sequence of operation is performed comprising successive automatic transfer of records from said supply to the turntable when upright, applying the tone reproducer to the upper surface of a record on the upright turntable, retracting said reproducer from the record, inverting the turntable and attached record, releasing the record, and moving the turntable to an upright position, a manual repeater control for determining a sequence of operation consisting in repetition of movement of the tone reproducer onto the record on a given side and under either a manual recording or a drop recording setting, interlock means for the manual repeater means adapted to prevent operation of said repeater means except when a record is being played by the tone reproducer, and manual sequence control means adapted to override the action of said sequence control means whereby completion of the playing of all or a part of a given side of a record may be eliminated.

30. In a record changer, a rotary turntable, means for depositing records upon said turntable, means embodied in the turntable for attracting the records to the turntable with a force greater than the weight of a record, means for inverting the turntable and the record thereon, a removable record-receiver means below said turntable, means operable to release records from the inverted turntable to descend into said receiver, energizing means for setting said turntable into motion, cooperative means between said receiver and said energizing means operable by the receiver to cut off said energizing means if the receiver is not properly positioned to receive released records, and an interlock means cooperating with said receiver when the receiver is in receiving position adapted to hold said receiver to receive records as long as said energizing means is causing functioning of said turntable.

31. In a player for disc records each having a central hole, an invertible turntable, inner and outer resilient lip means on the turntable adapted to be engaged by the hub of an applied record, the inner lip means being adapted to surround said hole in the record, means for applying a vacuum between said lips and under a record applied thereto, and means for breaking the vacuum and releasing the record after the turntable has been inverted.

32. In a record player, a vertically pivoted member, a tone arm horizontally pivoted on said vertically pivoted member, a vacuum-operated member carried on said vertically pivoted member and movable up in response to a vacuum and down in response to loss of vacuum, a lost-motion coupling between said vacuum-operated member and the tone arm, the lost motion being arranged to allow lifting of the tone arm by the vacuum-operated member during an upper part of the movement of the vacuum-operated member, said lost-motion connection allowing a complete downward movement of the vacuum-operated member with a partial downward movement of the tone arm when the latter descends to engage a horizontal record, and a second vacuum-operated member carried on said vertically pivoted member and movable downwardly in response to vacuum and normally biased upward, said second member being positioned to engage said lost-motion connection when biased upward to hold the tone arm up but disengaging said lost-motion connection in response to vacuum whereby the tone arm may move freely in response to downward movement of said first-mentioned vacuum-operated member.

33. A record changer comprising a rotary and invertible turntable, transfer means for successively transferring records from a supply to said turntable when the latter is upright, means embodied in the turntable for attracting records to the turntable with a force greater than the weight of a record, a tone reproducer movable to and across the record for playing and being retractable therefrom, means for inverting said turntable and releasing records therefrom, a first sequence means for controlling transfer of records to the turntable and playing them by means of the tone reproducer, inverting them, playing them on the reverse side by means of the tone reproducer and releasing them, clutch means adapted to start the operation of said first sequence means, a control means responsive to a predetermined position of the tone reproducer for closing said clutch to start said operation of said first sequence means, a second sequence means operable in conjunction with said first sequence means, a clutch for starting operation of said second sequence means, manual means for making effective said second sequence means, said control means in response to said tone reproducer being adapted when said second sequence means is effective to close its clutch as well as the clutch of said first sequence means to bring about a different sequence consisting in successive transfer of records from the supply to said turntable when upright, playing the upper sides only of said records by means of said tone reproducer and retracting the latter from the records, inverting the turntable with the record and releasing the record therefrom.

34. In a record changer, a rotary and invertible turntable, transfer means for moving records from a stack and depositing them successively upon the turntable, a vacuum circuit, means embodied in the turntable operative from said circuit for attracting deposited records to the turntable with a force greater than their respective weights, a tone reproducer operative from said circuit to be movable across a record face to play it and retractively movable from the record, vacuum means for inverting the turntable to invert a record, said tone reproducer being also vacuum-operated to function upon the bottoms of the records when inverted, vacuum-breaking means for releasing the record from the turntable when the latter is inverted, a first set of sequence cams controlling a set of valves in the vacuum circuit, a first cam shaft therefor, a first clutch for said first cam shaft, control means responsive to movement of said tone reproducer to a predetermined position on a record for closing said first clutch whereby the cam shaft is set into operation to cause through said valves and vacuum circuit the successive steps of application of records to the turntable, playing of both of their sides by said tone reproducer and releasing them when inverted; a second set of cams controlling a second set of valves in the vacuum circuit, a second cam shaft for operating them, a second clutch for said second cam shaft, a manual control valve for rearranging said vacuum circuit whereby said second set of cams overrides the operation on said circuit of some of the cams in said first set, the arrangement being such that when said vacuum circuit is reset, said control means closes both clutches, whereby records are caused through the action of said circuit to be successively applied to the turntable, played on the upper side only by said tone reproducer after which the turntable is inverted and the records released without playing their other side.

35. In a record changer, a rotary invertible turntable, transfer means for successively transferring records from a record supply to said turntable, means embodied in the turntable for attracting records to the turntable with a force greater than the weight of a record, means for inverting the turntable and automatically controlling the direction of its rotation, means for later releasing attraction on the record under conditions of turntable inversion, a tone reproducer mounted for movement across the face of a record on the turntable whether the latter is upright or inverted, a sequence means for controlling successive applications of records by the transfer means to the turntable while upright, playing an upright record by means of said tone reproducer, returning the tone reproducer from the record, inverting the turntable, playing the upper side of the inverted record by means of said tone reproducer, returning the tone reproducer from the record, releasing the record from the inverted turntable, and turning said turntable upright, control means operated by the tone reproducer after a first record of a series has been played to start operation of said sequence means, means for instigating shut-off of the record changer, and means for effecting actual shut-off at a time other than when records are being transferred or inverted.

36. In a record changer, a rotary invertible turntable, transfer means for successively transferring records from a record supply to said turntable, means embodied in the turntable for attracting records to the turntable with a force greater than the weight of a record, means for inverting the turntable and automatically reversing the direction of its rotation, means for releasing attraction on the record when the turntable is inverted, a tone reproducer mounted for movement across the face of a record on the turntable whether upright or inverted, a first sequence means for manual recordings for controlling successive applications of records by the transfer means to the turntable while the latter is upright, playing the upright record by means of said tone reproducer, returning the tone reproducer from the record, inverting the turntable, playing the inverted side of the record by means of said tone reproducer, returning the tone reproducer from the record, releasing the record from the inverted turntable, and turning said turntable upright, control means operated by the tone reproducer after a record has been played to start operation of said first sequence means, a second sequence means for drop recordings, manual means for actuating said second sequence means, whereby when said control means is operated by the tone reproducer a sequence of operation is performed comprising successive automatic transfer of records from said supply to the turntable when the latter is upright, applying the tone reproducer to the upper surface of a record on the upright turntable, retracting said reproducer from the record, inverting the turntable and attached record, releasing the record, and moving the turntable to an upright position, and a manual repeater control means determining a mere repetitious action of the tone reproducer onto and from the record under either a manual recording or a drop recording setting.

37. In a record changer, a rotary invertible turntable, means for applying records successively to the turntable, means embodied in the turntable for holding the records thereon, means for successively inverting the turntable with the records, means for releasing the records from the inverted turntable at a later stage, a tone arm mounted to swing in a plane substantially parallel to and above the plane of a record on the turntable, pusher means for the tone arm movable from a retracted position to a limiting position determined by the edge of a record to position the needle of the tone arm at the outer edge of the record groove, means for returning said pusher means to retracted position, means for applying the needle to the groove to play the record and allow the groove to feed the tone arm across the top of the record either when the turntable is upright or inverted, a plurality of selective manually controlled alternatively operable sequence means either of which is adapted for controlling successive applications of records to the turntable, movement of the tone arm to play the top of a record when the turntable is upright, and inversion of the turntable; one of said sequence means being adapted thereafter to cause application of the tone arm to the top of the inverted record and thereafter to cause release of the record after it has been played; the other sequence means being alternatively operable to cause release of the record without application of the tone arm to the top of the inverted record, manually controllable reject means for initiating operation of the sequence means at any desired time before the tone arm does so at the end of its playing travel, whereby desired portions of playing action of the tone arm may be skipped, and manually controllable repeater means operative in connection with either of said sequence means for repeating the playing of either side of any record on the turntable.

38. A record changer comprising a fixed support, a cradle mounted for swinging movement about a horizontal axis in said support, a rotary turntable carried by the cradle, a pair of stops on said support for limiting the swinging of the cradle to 180° between a position wherein the turntable is upright and a position wherein the turntable is inverted, a vacuum-operated reciprocable driving means operable through a stroke for moving the cradle between said positions, and means for retarding movement of the cradle as it approaches either of said stops comprising a pair of retarder valves positioned to be operated by said driving means near each end of its stroke for checking the vacuum of said vacuum-operated driving means.

39. In an automatic record changer, a frame, a vacuum turntable, for gripping a record by suction, mounted in the frame for pivotal movement about a horizontal axis between an upright position wherein it faces upward and an inverted position wherein it faces downward, said turntable being of such outline as to engage a record only at its ungrooved central portion to expose the playing grooves of both sides of the record, a source of vacuum, a connection from said source to said turntable for establishing a vacuum therein to grip a record by suction, and means in said connection operable to break the vacuum in the turntable after the latter is inverted, thereby to release a record and permit it to drop freely from the turntable.

40. In an automatic record changer as set forth in claim 39, means for reproducing the uppermost side of a record on the turntable, and means operable in response to conclusion of the reproduction of the uppermost side of the record for pivoting the turntable from one of its positions to the other.

41. In an automatic record changer as set forth in claim 39, means for reproducing the uppermost side of a record on the turntable, means operable in response to conclusion of the reproduction of the uppermost side of a record on the turntable when the latter is upright for pivoting the turntable to inverted position to present the other side of the record uppermost, means for subsequently actuating the reproducing means to reproduce said other side of the record, and means operable in response to conclusion of the reproduction of said other side first for operating said vacuum-breaking means to release the record and then to pivot the empty turntable back to upright position.

42. In an automatic record changer as set forth in claim 39, a reproducer for playing the uppermost side of a record on the turntable, record changing mechanism which is normally inoperative during the playing of a record, and a control for said mechanism operable in response to conclusion of the playing of the uppermost side of a record on the turntable when the latter is upright for initiating operation of the record changing mechanism through a first cycle wherein it pivots the turntable to inverted position to present the other side of the record uppermost and then actuates the reproducer to play said other side, said control being operable in response to conclusion of the playing of said other side to initiate operation of the record changing mechanism through a second cycle wherein it actuates said vacuum-breaking means to release the record and then pivots the empty turntable back to upright position.

43. In an automatic record changer as set forth in claim 39, a reproducer for playing the uppermost side of a record on the turntable, record changing mechanism which is normally inoperative during the playing of a record, and a control for said mechanism operable in response to conclusion of the playing of the uppermost side of a record on the turntable when the latter is upright for initiating operation of the record changing mechanism through a first cycle wherein it pivots the turntable to inverted position to present the other side of the record uppermost and then actuates the reproducer to play said other side, said control being operable in response to conclusion of the playing of said other side to initiate operation of the record changing mechanism through a second cycle wherein it actuates said vacuum-breaking means to release the record and then pivots the empty turntable back to upright position, and a manually controllable selector for selectively setting the record changing mechanism to operate through said first and second cycles or, alternatively, to operate in response to conclusion of the playing of the uppermost side of a record on the turntable when the latter is upright through a single cycle wherein it pivots the turntable to inverted position, then actuates said vacuum-breaking means to release the record, and then pivots the empty turntable back to upright position to eliminate playing of the other side of the record.

44. An automatic record changer comprising a frame, a turntable mounted in the frame for pivotal movement between an upright position wherein it faces upward and an inverted position wherein it faces downward, said turntable including means for releasably gripping a record, means adjacent the turntable for holding a supply of records, a record transfer device carried by the frame for successively transferring records from the supply to the turntable, record changing mechanism for controlling pivotal movement of the turntable and operation of the transfer device and including means operable in timed relation to movement of the turntable for actuating the transfer device to transfer a record to the turntable after the latter is pivoted to upright position, and further including means for releasing the grip on the record when the turntable is inverted.

45. An automatic record changer comprising a frame, a vacuum turntable, for gripping the central ungrooved portion of a record by suction, mounted in the frame for pivotal movement between an upright position wherein it faces upward and an inverted position wherein it faces downward; means adjacent the turntable for holding a supply of records; a record transfer device carried by the frame for successively transferring records from the supply to the turntable; a reproducer carried by the frame for playing the uppermost side of a record on the turntable; and record changing mechanism for controlling the vacuum in the turntable, pivotal movement of the turntable, operation of the transfer device, and operation of the reproducer, said record changing mechanism being operable in response to conclusion of the playing of the uppermost side of a record on the turntable when the latter is upright through a first cycle wherein it pivots the turntable to inverted position to present the other side of the record uppermost, then actuates the reproducer to play said other side, said mechanism subsequently being operable in response to conclusion of the playing of said other side through a second cycle wherein it breaks the vacuum in the turntable to release the record, pivots the empty turntable back to upright position, actuates the transfer device to transfer another record from the supply to the upright turntable, then actuates the reproducer to play the uppermost side of the latter record.

46. An automatic record changer as set forth in claim 45, further including a manually controllable selector for selectively setting the record changing mechanism to operate through said first and second cycles, or, alternatively, to operate in response to conclusion of the playing of the uppermost side of a record on the turntable when the latter is upright through a single cycle wherein it pivots the turntable to inverted position, then actuates said vacuum-breaking means to release the record, and then pivots the empty turntable back to upright position to eliminate playing of the other side of the record.

47. An automatic record changer as set forth in claim 46, further including a manually controllable record rejector for initiating operation of said record changing mechanism at will during the playing of either side of a record.

48. An automatic record changer as set forth in claim 45, further including means responsive to initiation of operation of the record changing mechanism through either cycle to maintain said mechanism in operation until the cycle is wholly completed, so that the turntable is prevented from stopping in a position intermediate its upright and inverted positions.

49. An automatic record changer as set forth in claim 45, further including means operable to stop the operation of the record changer if no record is transferred from the supply to the turntable during said second cycle.

50. An automatic record changer comprising a frame; a vacuum turntable, for gripping the central ungrooved portion of a record by suction, mounted in the frame for pivotal movement between an upright position wherein it faces upward and an inverted position wherein it faces downward; means to one side of the turntable for holding a supply of records to be played; a receiver below the turntable for played records and accessible for removal thereof; a record transfer device carried by the frame for automatically successively transferring records from the supply to the turntable; a reproducer carried by the frame for automatically playing the uppermost side of a record on the turntable, adapted to play one side of the record when the turntable is in upright position and the other side when the turntable is in inverted position; means for automatically pivoting the turntable between upright and inverted positions upon the conclusion of the playing of the uppermost side of a record; means for automatically reversing the direction of rotation of the turntable upon such pivoting movement to maintain its direction of rotation relative to the reproducer the same in either position of the turntable; and means for automatically breaking the vacuum in the turntable upon the conclusion of the playing of the uppermost side of a record on the turntable when in inverted position to release the record, whereupon the record drops flatwise into said receiver, cushioned by the air between the record and receiver to prevent breakage.

51. In a record changer, a record turntable mounted for movement between an upright position wherein it faces upward and an inverted position wherein it faces downward with its record-engaging face substantially horizontal, means embodied in the turntable for releasably gripping a record to hold it on the turntable when the latter is in inverted position, a record receiver positioned below the turntable having a substantially flat, horizontal upper surface opposed to the face of the turntable when the latter is in inverted position, and means for releasing the grip on the record when the turntable is inverted to allow the record to drop flatwise onto said surface, the record being thereby air-cushioned in its fall to prevent breakage.

52. In a record changer, a record turntable having an outside diameter less than the outside diameter of the smallest record which the record changer is to accommodate, so that the edge of any record placed on the turntable is outside the periphery of the turntable, a tone arm mounted for swinging movement substantially parallel to the plane of a record on the turntable toward and away from a retracted position clear of the largest record which the record changer is to accommodate, and also mounted for movement substantially perpendicular to the plane of the record between a raised position with its needle clear of the record and a playing position with its needle in the record groove, a push bar mounted to swing substantially parallel to the plane of the record from a retracted position clear of the largest record which the record changer is to accommodate toward the turntable, said bar being fixed against movement perpendicular to the plane of a record on the turntable and being adapted to engage the tone arm while the latter is raised to push it toward a record and to be stopped by engagement with the edge of a record of any size on the turntable within the range from the smallest to the largest record which the record changer is to accommodate, and thereby to determine a position of the needle for entry into the outer end of the record groove, tone arm control means independent of the push bar for holding the tone arm in raised position while the latter is being pushed toward the record by the push bar and for lowering the tone arm to enter the needle in the outer end of the record groove, means for swinging the push bar toward and away from the turntable, means operable in response to movement of the tone arm into the inner end of the record groove to cause said tone arm control means to raise the tone arm, and means for then swinging the tone arm back to its retracted position while raised.

53. In a record changer, a record turntable, smaller than the ungrooved central portion of a record, pivoted for swinging movement between an upright position wherein it faces upward and an inverted position wherein it faces downward, means associated with the turntable for holding a record thereon, a reproducer for playing the uppermost side of a record on the turntable, power-operated mechanism connected to the turntable adapted automatically to swing it from its upright to its inverted position, and means operable in response to completion of the playing of the uppermost side of a record on the turntable in its upright position for initiating operation of said power-operated mechanism automatically to invert the turntable.

54. In a record changer, a record turntable, smaller than the ungrooved central portion of a record, pivoted for swinging movement between an upright position wherein it faces upward and an inverted position wherein it faces downward, means associated with the turntable for holding a record thereon, a reproducer for playing the uppermost side of a record on the turntable whether the latter is upright or inverted, power-operated means for raising the reproducer from a record and moving it to a retracted position clear of the record, power-operated means for automatically swinging the turntable from its upright to its inverted position, and means operable by the reproducer at the completion of the playing of the uppermost side of a record on the turntable in its upright position for initiating operation of said power-operated means automatically and sequentially to raise and retract the reproducer and then to invert the turntable to position the record for playing its other side.

55. In a record changer, a record turntable, smaller than the ungrooved central portion of a record, pivoted for swinging movement between an upright position wherein it faces upward and an inverted position wherein it faces downward, means associated with the turntable for holding a record thereon, a reproducer for playing the uppermost side of a record on the turntable whether the latter is upright or inverted, means for driving the turntable including a reversing mechanism adapted to reverse the direction of rotation of the turntable upon swinging movement thereof so as to maintain its direction of rotation relative to the reproducer the same in either position of the turntable, power-operated means for raising the reproducer from a record and moving it to a retracted position clear of the record, power-operated means for automatically swinging the turntable from its upright to its inverted position, and means operable by the reproducer at the completion of the playing of the uppermost side of a record on the turntable in its upright position for initiating operation of said power-operated means automatically and sequentially to raise and retract the reproducer and then automatically to invert the turntable to position the record for playing its other side.

56. In a record changer, a record turntable, smaller than the ungrooved central portion of a record, pivoted for swinging movement between an upright position wherein it faces upward and an inverted position wherein it faces downward, means associated with the turntable for holding a record thereon, a reproducer for playing the uppermost side of a record on the turntable whether the latter is upright or inverted, means for driving the turntable including a reversing mechanism adapted to reverse the direction of rotation of the turntable upon swinging movement thereof so as to maintain its direction of rotation relative to the reproducer the same in either position of the turntable, power-operated means for raising the reproducer from a record and moving it to a retracted position clear of the record, power-operated means for automatically swinging the turntable from its upright to its inverted position, power-operated means for returning the reproducer to start the playing of a record, and means operable by the reproducer at the completion of the playing of the uppermost side of a record on the turntable in its upright position for initiating operation of said power-operated means automatically and sequentially to raise and retract the reproducer, invert the turntable, and return the reproducer to play the other side of the record on the turntable.

57. An automatic record changer comprising a frame, a turntable mounted in the frame for pivotal movement between upright and inverted positions, means adjacent said frame for holding a supply of vertically stacked records of different diameters including a vertical centering pin upon which the records are centered, a transfer device carried by the frame for transferring the uppermost record of the stack to the turntable when the latter is upright, a tone arm mounted for swinging movement on the frame between a retracted position beyond the edge of the largest size of record to be played and playing position with respect to the uppermost side of any record on the turntable, means for automatically moving said tone arm from retracted position to a starting position for playing a record of any diameter upon its transfer from the supply to the turntable comprising a push bar engageable with the tone arm and mounted on the frame for movement from a retracted position beyond the edge of the largest size of record to be played toward the edge of a record on the turntable, said bar being adapted to push the tone arm from its retracted position toward the record until the bar engages the edge of the record, whereupon the tone arm is positioned in starting position with respect to the record, and means responsive to movement of the push bar toward the turntable if there is no record on the turntable for stopping the operation of the record changer.

VICTOR G. KLEIN.
CARL H. MUELLER.

REFERENCES CITED

The following references are of record in the file of this patent:

UNITED STATES PATENTS

| Number | Name | Date |
|---|---|---|
| 1,802,152 | Marr | Apr. 21, 1931 |
| 1,906,620 | Knight et al. | May 2, 1933 |
| 1,918,588 | Bryant | July 18, 1933 |
| 2,068,449 | Downs | Jan. 19, 1937 |
| 2,146,519 | Zimmerman | Feb. 7, 1939 |
| 2,370,875 | Pressley | Mar. 6, 1943 |

FOREIGN PATENTS

| Number | Country | Date |
|---|---|---|
| 710,187 | France | Aug. 19, 1931 |
| 556,907 | Germany | Aug. 16, 1932 |